United States Patent [19]
Fullerton

[11] Patent Number: 5,952,956
[45] Date of Patent: Sep. 14, 1999

[54] TIME DOMAIN RADIO TRANSMISSION SYSTEM

[75] Inventor: Larry W. Fullerton, Brownsboro, Ala.

[73] Assignee: Time Domain Corporation, Huntsville, Ala.

[21] Appl. No.: 08/480,447

[22] Filed: Jun. 7, 1995

Related U.S. Application Data

[63] Continuation-in-part of application No. 08/335,676, Nov. 8, 1994, abandoned, and application No. PCT/US90/01174, Mar. 2, 1990, which is a continuation-in-part of application No. PCT/US89/01020, Mar. 10, 1989, which is a continuation-in-part of application No. 07/010,440, Feb. 3, 1987, Pat. No. 4,813,057, said application No. 08/335,676, is a continuation-in-part of application No. 07/846,597, Mar. 5, 1992, Pat. No. 5,363,108, which is a continuation of application No. 07/368,831, Jun. 20, 1989, abandoned, which is a continuation-in-part of application No. 07/192,475, May 10, 1988, abandoned, which is a continuation-in-part of application No. 06/870,177, Jun. 3, 1986, Pat. No. 4,743,906, which is a continuation-in-part of application No. 06/677,597, Dec. 3, 1984, Pat. No. 4,641,317.

[51] Int. Cl.$^6$ .............................. G01S 13/04; H04L 27/30
[52] U.S. Cl. ............................. 342/27; 342/21; 375/200; 375/239; 375/256; 380/34
[58] Field of Search ................................. 359/237, 238, 359/240, 245, 265, 278, 290, 321, 322, 323, 326, 327, 332; 385/1, 2, 34; 375/200–204, 206–210, 345, 239, 256; 342/21, 22, 27, 28, 118, 120, 127, 132, 134, 145, 201; 455/76; 380/34

[56] References Cited

U.S. PATENT DOCUMENTS

| | | |
|---|---|---|
| 3,406,356 | 10/1968 | Peters ................................... 359/278 X |
| 3,641,434 | 2/1972 | Yates et al. ............................... 455/76 |
| 3,659,203 | 4/1972 | Ross et al. . |
| 3,662,316 | 5/1972 | Robbins . |
| 3,728,632 | 4/1973 | Ross et al. . |
| 3,739,392 | 6/1973 | Ross et al. . |
| 3,750,025 | 7/1973 | Ross . |
| 3,794,996 | 2/1974 | Robbins et al. . |
| 4,070,621 | 1/1978 | Bassen et al. ....................... 359/245 X |
| 4,291,410 | 9/1981 | Caples et al. ............................ 375/345 |
| 4,641,317 | 2/1987 | Fullerton et al. . |
| 4,695,752 | 9/1987 | Ross et al. . |
| 4,743,906 | 5/1988 | Fullerton et al. .......................... 342/27 |
| 4,813,057 | 3/1989 | Fullerton et al. . |
| 4,979,186 | 12/1990 | Fullerton et al. . |
| 5,337,054 | 8/1994 | Ross et al. ................................ 342/93 |
| 5,353,303 | 10/1994 | Walthall ................................. 375/200 |
| 5,610,907 | 3/1997 | Barrett ................................ 375/203 X |
| 5,677,927 | 10/1997 | Fullerton et al. ........................ 375/200 |
| 5,687,169 | 11/1997 | Fullerton et al. ........................ 370/324 |

OTHER PUBLICATIONS

Harmuth, Henning F., "Selective Reception of Periodic Electromagnetic Waves with General Time Variation", *IEEE Transaction on Electromagnetic Compatibility*, vol. EMC–19, No.3, Aug. 1977, pp. 137–144.

Miller, E.K. (ed.), *Time–Domain Measurements In Electromagnetics*, Van Nostrand Reinhold, 1986, pp. 1–43.

(List continued on next page.)

*Primary Examiner*—Bernarr E. Gregory
*Attorney, Agent, or Firm*—Sterne, Kessler, Goldstein & Fox P.L.L.C.

[57] ABSTRACT

A time domain communications system wherein a broadband of time-spaced signals, essentially monocycle-like signals, are derived from applying stepped-in-amplitude signals to a broadband antenna, in this case, a reverse bicone antenna. When received, the thus transmitted signals are multiplied by a D.C. replica of each transmitted signal, and thereafter, they are, successively, short time and long time integrated to achieve detection.

18 Claims, 13 Drawing Sheets

OTHER PUBLICATIONS

Bennett, C.L. and Ross, G.F., "Time–Domain Electromagnetics and Its Applications", *Proceedings of the IEEE*, vol. 66, No. 3, Mar. 1978, pp. 299–318.

Varganov et al., *Radar Response of Flight Vehicles*, Radio I svyaz' Press, Moscow, 1985, p. 5.

Meleshko, E.A., *Nanosecond Electronics in Experimental Physics*, Ehnergoatomizdat Press, Moscow, 1987, pp. 58–68.

Astanin, L. Yu. and Kostylev, A.A., *Principles of Superwideband Radar Measurements*, Radio I svyaz', Moscow, 1989, pp. 104 and 108–109.

Harmuth, Henning F., *Transmission of Information by Orthogonal Functions*, Second Edition, Springer–Verlag, 1972, pp. 244–245, 282–291.

Harmuth, Henning F., *Antennas and Waveguides for Nonsinusoidal Waves*, Academic, 1984, pp. 2–27.

Harmuth, Henning F., *Nonsinusoidal Waves for Radar and Radio Communication*, Academic, 1981, pp. 142–143, 288–289, 292–293, 296–297 and 302–305.

Harmuth, Henning F., *Sequency Theory: Foundations and Applications*, Academic, 1977, pp. 122–123, 126–135, 235–239, 284–285, 294–295, 300–301, 316–319 and 340–341.

Harmuth, Henning F., "Range–Doppler Resolution of Electromagnetic Walsh Waves of Radar", *IEEE Transactions on Electromagnetic Compatibility*, vol. EMC–17, No. 2, May 1975, pp. 106–111.

Bertoni et al., *Ultra–Wideband Short–Pulse Electromagnetics*, Plenum Press, 1993.

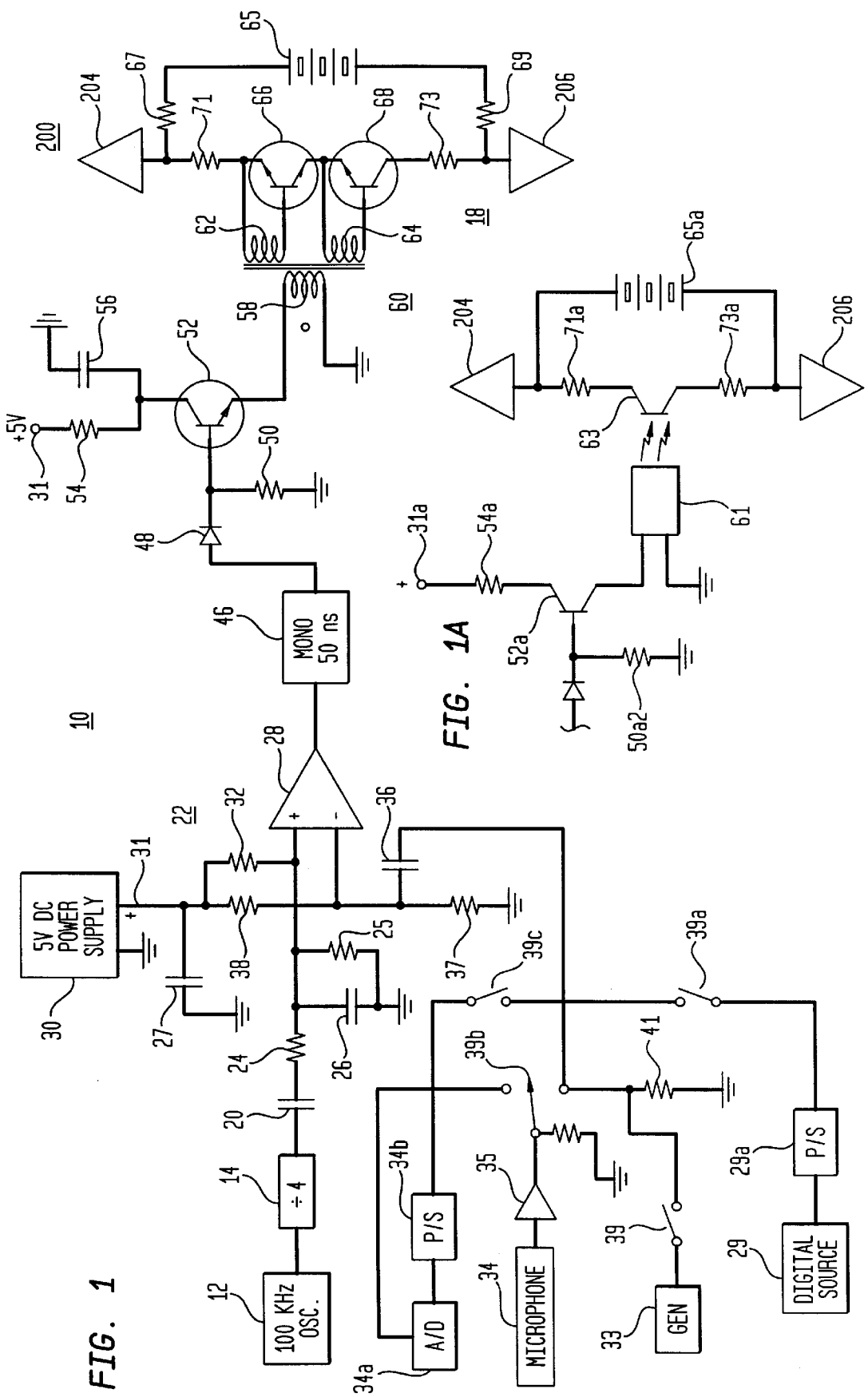

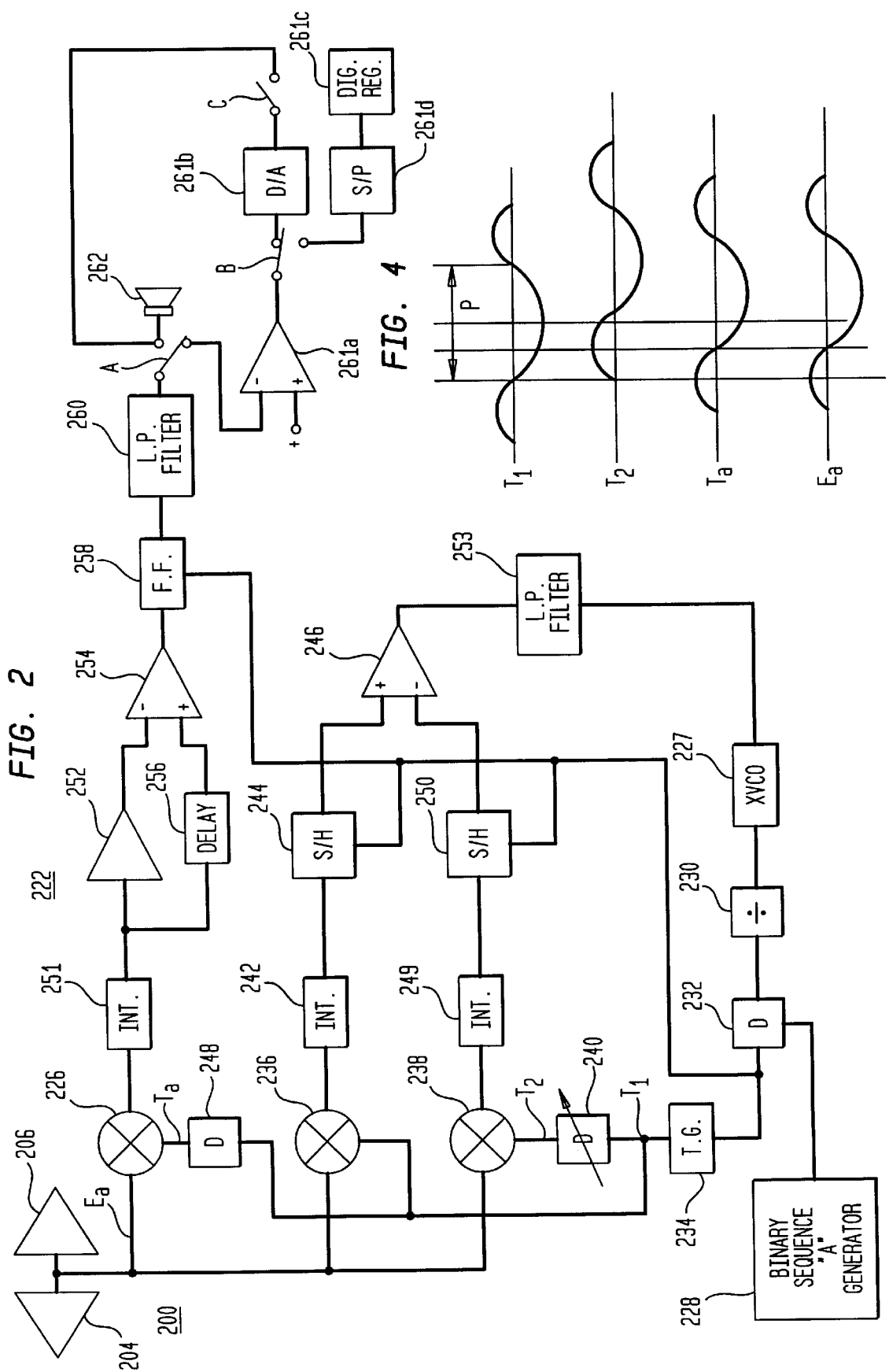

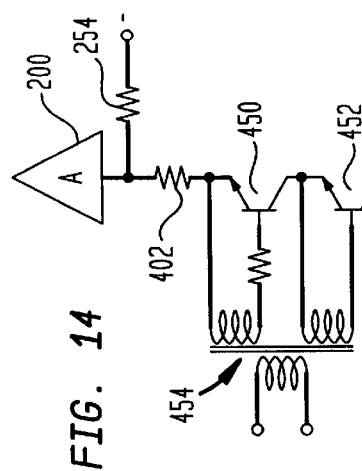
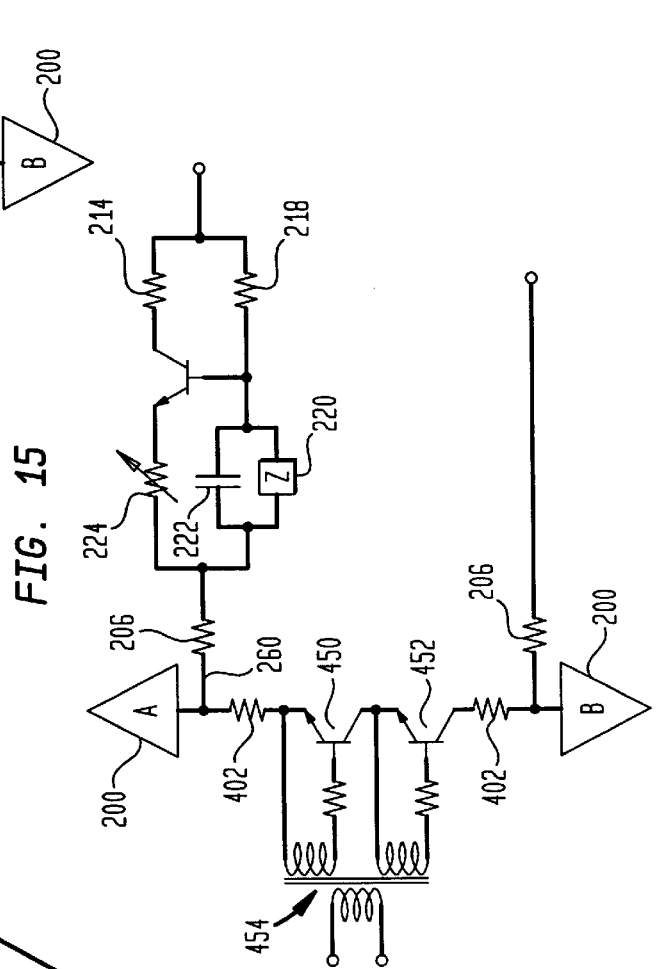
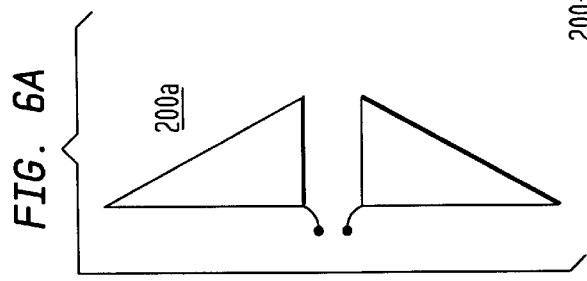
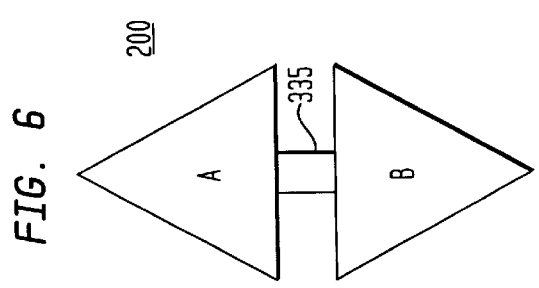
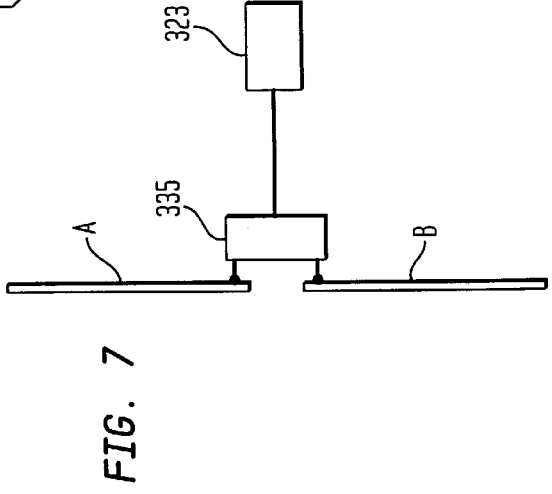

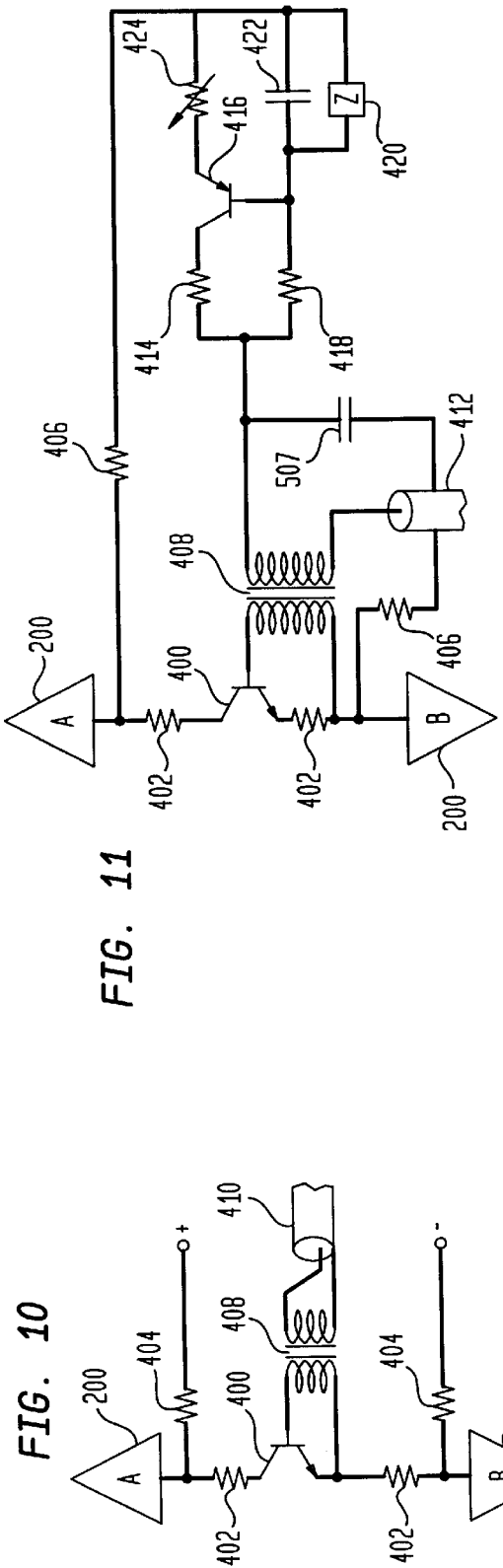
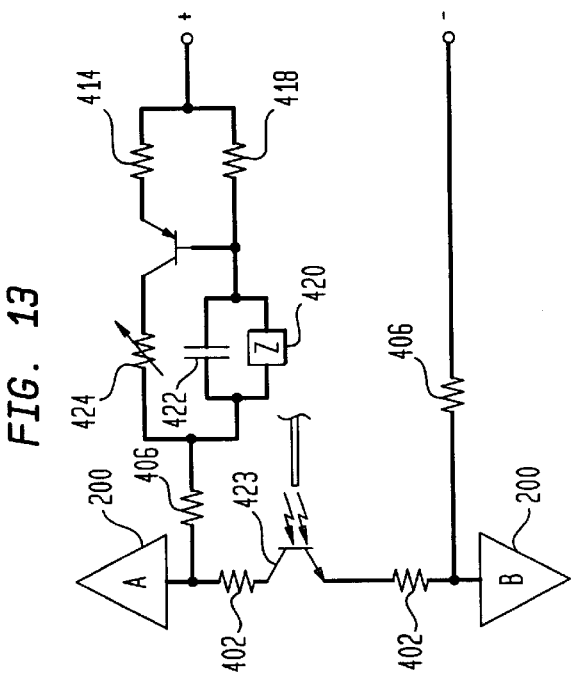
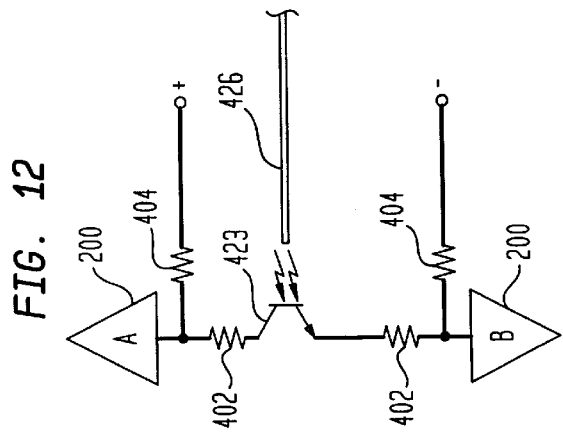
FIG. 11
FIG. 13
FIG. 10
FIG. 12

TIME DOMAIN RADIO TRANSMISSION SYSTEM

CROSS-REFERENCE OF RELATED APPLICATIONS

This application is a continuation-in-part of application Ser. No. 08/335,676, filed on Nov. 8, 1994, now abandoned, which is a continuation-in-part of application Ser. No. 07/846,597, filed on Mar. 5, 1992, now U.S. Pat. No. 5,363,108, which is a continuation of application Ser. No. 07/368,831, filed on Jun. 20, 1989, now abandoned; which is a continuation-in-part of application Ser. No. 07/192,475, filed on May 10, 1988 now abandoned; which is a continuation-in-part of application Ser. No. 06/870,177, filed on Jun. 3, 1986, now U.S. Pat. No. 4,743,906; which is a continuation-in-part of application Ser. No. 06/677,597, filed on Dec. 3, 1984, now U.S. Pat. No. 4,641,317.

This application is also a continuation-in-part of International Application No. PCT/US90/01174, filed on Mar. 2, 1990, which is a continuation-in-part of International Application No. PCT/US89/01020, filed on Mar. 10, 1989. Said PCT Application No. PCT/US89/01020 is also a continuation-in-part of U.S. application Ser. No. 07/010,440, filed on Feb. 3, 1987, now U.S. Pat. No. 4,813,057.

This above-named prior patent applications and patents are hereby incorporated by reference.

FIELD OF THE INVENTION

This invention relates generally to radio systems wherein time-spaced, essentially monocycle-like signals are created from DC pulses and transmitted into space wherein the resulting energy bursts are dispersed in terms of frequency to where the spectral density essentially merges with ambient noise, and yet information relating to these bursts is recoverable.

BACKGROUND OF THE INVENTION

Radio transmissions have heretofore been largely approached from the point of view of frequency channelling. Thus, coexistent orderly radio transmissions are permissible by means of assignment of different frequencies or frequency channels to different users, particularly as within the same geographic area. Essentially foreign to this concept is that of tolerating transmissions which are not frequency limited. While it would seem that the very notion of not limiting frequency response would create havoc with existing frequency denominated services, it has been previously suggested that such is not necessarily true, and that, at least theoretically, it is possible to have overlapping use of the radio spectrum. One suggested mode is that provided wherein very short (on the order of one nanosecond or less) radio pulses are applied to a broadband antenna which ideally would respond by transmitting short burst signals, typically comprising three or four polarity lobes, which comprise, energywise, signal energy over essentially the upper portion (above 100 megacycles) of the most frequently used radio frequency spectrum, that is, up to the mid-gigahertz region. A basic discussion of impulse effected radio transmission is contained in article entitled "Time Domain Electromagnetics and Its Application, " Proceedings of the IEEE, Volume 66, No. 3, March 1978. This article particularly suggests the employment of such technology for baseband radar, and ranges from 5 to 5,000 feet are suggested. As noted, this article appeared in 1978, and now, 16 years later, it is submitted that little has been accomplished by way of achieving commercial application of this technology.

From both a theoretical and an experimental examination of the art, it has become clear to the applicant that the lack of success has largely been due to several factors. One is that the extremely wide band of frequencies to be transmitted poses very substantial requirements on an antenna. Antennas are generally designed for limited frequency bandwidths, and traditionally when one made any substantial change in frequency, it became necessary to choose a different antenna or an antenna of different dimensions. This is not to say that broadband antennas do not, in general, exist; however, applicant has reviewed many types including bicone, horn, and log periodic types and has determined that none provided a practical antenna which will enable impulse radio and radar usage to spread beyond the laboratory. Of the problems experienced with prior art antennas, it is to be noted that log periodic antennas generally produce an undesired frequency dispersion. Further, in some instances, elements of a dipole type antenna may be configured wherein there is a DC path between elements, and such is not operable for employment in applicant's transmitter.

A second problem which has plagued advocates of the employment of impulse or time domain technology for radio is that of effectively receiving and detecting the presence of the wide spectrum that a monocycle burst produces, particularly in the presence of high levels of existing ambient radiation, presently nearly everywhere. Ideally, a necessary antenna would essentially evenly reproduce the spectrum transmitted, and the receiver it feeds would have special properties which enable it to be utilized despite the typically high noise level with which it must compete. The state of the art prior to applicant's entrance generally involved the employment of brute force detection, i.e., that of threshold or time threshold gate detection. Threshold detection simply enables passage of signals higher than a selected threshold level. The problem with this approach is obvious that if one transmits impulse generated signals which are of sufficient amplitude to rise above ambient signal levels, the existing radio services producing the latter may be unacceptably interfered with. For some reason, perhaps because of bias produced by the wide spectrum of signal involved, e.g., from 50 mHz to on the order of 5 gHz or ever higher, the possibility of coherent detection has been thought impossible.

Accordingly, it is an object of this invention to provide an impulse or time domain (or baseband) transmission system which attacks all of the above problems and to provide a complete impulse time domain transmission system which, in applicant's view, eliminates the known practical barriers to its employment, and, importantly, its employment for all important electromagnetic modes of radio, including communications, telemetry, navigation and radar.

SUMMARY OF THE INVENTION

With respect to the antenna problem, applicant has determined a truly pulse-responsive antenna which translated an applied DC impulse into essentially a monocycle. It is a dipole which is completely the reverse of the conventional bat wing antenna and wherein two triangular elements of the dipole are positioned with their bases closely adjacent but DC isolated. They are driven at near adjacent points on the bases bisected by a line between apexes of the two triangular elements. This bisecting line may mark a side or height dimension of the two triangular elements.

As a further consideration, power restraints in the past have been generally limited to the application of a few hundred volts of applied signal energy to the transmitting antenna. Where this is a problem, it may be overcome by a transmitter switch which is formed by a normally insulating crystalline structure, such as diamond material sandwiched between two metallic electrodes, which are then closely coupled to the elements of the antenna. This material is switched to a conductive, or less resistive, state by exciting it with an appropriate wavelength beam of light, ultraviolet in the case of diamond. In this manner, no metallic triggering communications line extends to the antenna which might otherwise pick up radiation and re-radiate it, adversely affecting signal coupling to the antenna and interfering with the signal radiated from it, both of which tend to prolong the length of a signal burst, a clearly adverse effect.

With respect to a radio receiver, a like receiving antenna is typically employed to that used for transmission as described above. Second, a locally generated, coordinately timed signal, to that of the transmitted signal, is either detected from the received signal, as in communications or telemetry, or received directly from the transmitter, as, for example, in the case of radar. Then, the coordinately timed signal, typically including a basic half cycle, or a few, up to 10 half cycles, of signal, is mixed or multiplied by a factor of 1 (as with sampling or gating of the received signals), or ideally, as where the coordinately locally generated signal is curved, the factor is greater than one, giving rise to amplification in the process of detection, a significant advantage. Thus, the modulation on a signal, or position of a target at a selected range, as the case may be, is determined. Such a detection is further effected by an integration of the detected signal, with enhanced detection being accomplished by both a short term and long term integration. In this latter process, individual pulse signals are integrated only during their existence to accomplish short term integration, and following this, the resultant short term integration signals are long term integrated by integrating a selected number of these and particularly by a method which omits the noise signal content which occurs between individual pulse signals, thereby effecting a very significant increase in signal-to-noise ratio.

It is acknowledged that coherent detection of frequency signals has been effected by the employment of coincidence detection, followed by only long term detection, but it is submitted that such coherent detection did not contemplate the local generation of a signal but contemplated storing of a portion of a transmitted signal which was then phase coordinated with the incoming signal, which on its face presents an essentially impossible task where there is the detection of a ultra wideband frequency pulse as in the present case.

Further, transmitted burst signals may be varied in time pattern (in addition to a modulation pattern for communications or telemetry). This greatly increases the security of the system and differentiates signals from nearly, if not all, ambient signals, that is, ambient signals which are not synchronous with transmitted burst signals. This also enables the employment of faster repetition rates with radar which would, absent such varying or dithering, create range ambiguities as between returns from successive transmission and therefore ranges. Burst signals are signals generated when a stepped, or near stepped, voltage change is applied to an impulse-responsive antenna as illustrated and discussed herein.

As still a further feature of this invention, the repetition rate of burst signals may be quite large, say, for example, up to 100 mHz, or higher, this enabling a very wide frequency dispersion; and thus for a given overall power level, the energy at any one frequency would be extremely small, thus effectively eliminating the problem of interference with existing radio frequency based services.

As still a further feature of this invention, moving targets are detected in terms of their velocity by means of the employment of a bandpass filter, following mixing and double integration of signals.

As a still further feature of the invention, when employed in this latter mode, two channels of reception are ideally employed wherein the incoming signal is multiplied by a selected range, or timed, locally generated signal in one channel, and mixing the same incoming signal by a slightly delayed, locally generated signal in another channel, delay being on the order of one-quarter to one-half the time of a monocycle. This accomplishes target differentiation without employing a separate series of transmissions.

As still another feature of this invention, multiple radiators or receptors would be employed in an array wherein their combined effect would be in terms of like or varied-in-time of sensed (or transmitted) output, to thereby accent either a path normal to the face of the antenna or to effect a steered path offset to a normal path accomplished by selected signal delay paths.

As still another feature of this invention, radio antenna elements would be positioned in front of a reflector wherein the distance between the elements and reflector is in terms of the time of transmission from an element or elements to reflector and back to element(s), typically up to about three inches, this being with tip-to-tip dimension of elements of somewhat below nine inches up to approximately nine inches.

BRIEF DESCRIPTION OF THE DRAWINGS

FIG. 1 is a combination block-schematic diagram of an intelligence time domain transmission system.

FIG. 1a is a schematic diagram of an alternate form of the output stage of the transmitter shown in FIG. 1.

FIG. 2 is a block diagram of a time domain receiver as contemplated by this invention.

FIG. 3A, FIG. 3B, FIG. 3C, FIG. 3D, FIG. 3E, FIG. 3F, FIG. 3G, FIG. 3H, FIG. 3I, FIG. 3J, FIG. 3K, and FIG. 3L, depict electrical waveforms illustrative of aspects of the circuitry shown in FIGS. 1 and 1a.

FIG. 4T1, FIG. 4T2, FIG. 4Ta and FIG. 4Ea is a set of electrical waveforms illustrating aspects of operation of the circuitry shown in FIG. 2.

FIGS. 6, 6a and 7 illustrate the configuration of an antenna in accordance with the invention.

FIGS. 10–15 illustrate different switching assemblies as employed in the charging and discharging of antennas to effect signal transmission.

FIGS. 18, 18a and 19 illustrate the general arrangement of transmission and receiving antennas for three-dimensional location of targets.

DESCRIPTION OF THE PREFERRED EMBODIMENT

Figure 3A:
Figure 3B:
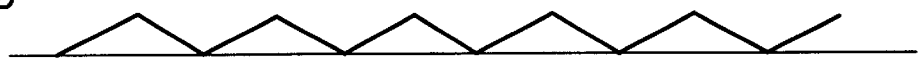
Figure 3C:
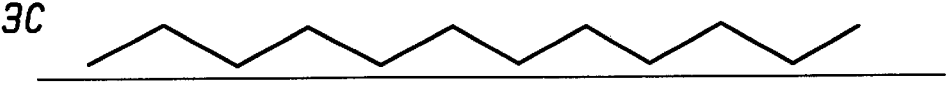
Figure 3D:
Figure 3E:
Figure 3F:
Figure 3G:
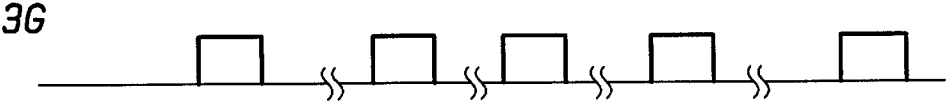
Figure 3H:
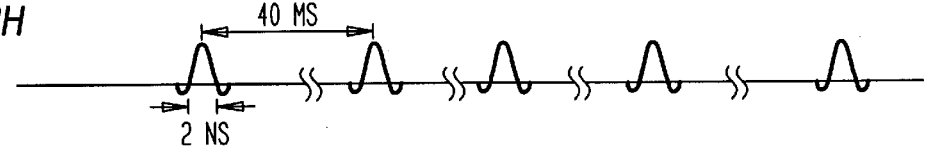
Figure 3I:
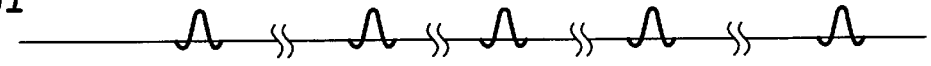
Figure 3J:
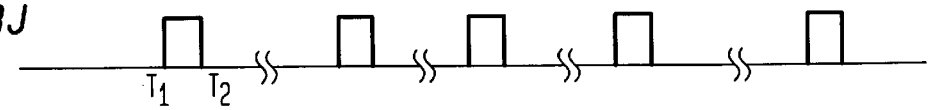
Figure 3K:
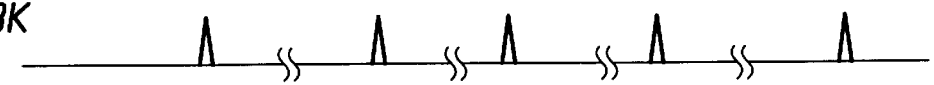
Figure 3L:
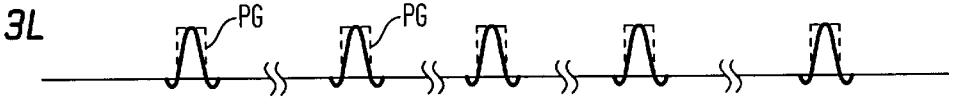

Referring to FIG. 1, and initially to transmitter 10, a base frequency of 100 kHz is generated by oscillator 12, typically being a crystal controlled oscillator. Its output, a pulse signal, is applied to ÷4 divider 14 to provide at its output a 25-kHz (0 to 5 volts) pulse signal shown in waveform A. of FIG. 3. Further alphabetic references to waveforms will simply identify them by their letter identity and will not further refer to the figure, which will be FIG. 3. The 25-kHz output is employed as a general transmission signal.

The output of ÷4 divider 14 is employed as a signal base and as such is supplied through capacitor 20 to pulse position modulator 22. Pulse position modulator 22 includes in its input an RC circuit consisting of resistor 24 and capacitor 26 which convert the square wave input to an approximately triangular wave as shown in waveform B, it being applied across resistor 25 to the non-inverting input of comparator 28. A selected or reference positive voltage, filtered by capacitor 27, is also applied to the non-inverting input of comparator 28, it being supplied from +5-volt terminal 31 of DC bias supply 30 through resistor 32. Accordingly, for example, there would actually appear at the non-inverting input a triangular wave biased upward positively as illustrated by waveform C.

The actual conduction level of comparator 28 is determined by an input signal supplied through capacitor 36, across resistor 37, to the inverting input of comparator 28, as biased from supply 30 through resistor 38 and across resistor 32. The combined signal input bias is illustrated in waveform D.

With switches 39, 39a, and 39c open and switch 39b in the alternate position to that shown, signal input would be simply the audio output of microphone 34, amplified, if needed, by amplifier 35. Alternately, by closing switch 39, the signal input to comparator 28 would be the sum of the audio output and a signal offset or dither voltage, for example, provided by the output of signal generator 33, these signals being summed across resistor 41. Signal generator 33 may, for example, provide a sine, binary, or other signal, and, as illustrated, it is labeled as providing a "binary sequence A." Thus, generator 33 would provide a binary signal voltage as a sequence of discrete voltage pulses varying between zero voltage and some discrete voltage, which may be representative of letters or numerical values or simply a random value. Thus, the input to comparator 28 would be the sum of these voltages, and by virtue of this combination, the output of comparator 28 would rise to a positive saturation level when triangular wave signal 40 (waveform E) is of a higher value than the effective modulation signal 42 and drop to a negative saturation level when modulation signal 42 is of a greater value than the triangular wave signal 40. The output signal of comparator 28 is shown in waveform F, and the effect is to vary the turn-on and turn-off of the pulses shown in this waveform as a function of the combination of the intelligence and dither signals where one is employed. Thus, there is effected a pulse position modulation from an amplitude signal. The dither signal enables an added discrete pattern of time positions to be included with a transmitted signal, thus requiring that to receive and demodulator it, the dither signal must be accurately reproduced.

FIG. 1 also shows alternate arrangements for converting the analog voltage derived from microphone 34 to binary form or the employment of a general digital source, such as a computer, and whereby the output of comparator 28 would be governed by one of such sources. Accordingly, with switch 39 closed, and providing a dither voltage, it would be combined with one of two other intelligence sources, either a digitally encoded voice signal or a digital signal from some independent digital source. Thus, in one instance, switch 39a would be open and switches 39 and 39c closed, with switch 39b positioned to provide the signal from amplifier 35 to A/D converter 34a. In such case, the microphone signal from amplifier 35 would be fed to A-D converter 34a, and the resulting digitized output, being in parallel, would be fed to parallel-to-serial converter 34b wherein its output would be a serial digital binary output which would be fed to comparator 28 as the sum of the dithered voltage and binary output of parallel-to-serial converter 34b.

As the other alternative, with switches 39 and 39a closed and switch 39c open, the input to comparator 28 would be the sum of the dithered and digital source voltage. The digital source voltage is provided by digital source 29, and assuming that it is in parallel form, it would be converted to a serial form by parallel-to-serial converter 29a, and then with switch 39a closed, it would be provided along with the dithered output of generator 33 as an intelligence input to the inverting input of comparator 28. Thus, the output of comparator 28 would be the algebraic sum of the voltages applied to comparator 28 as previously described.

With respect to the output signal of comparator 28, we are interested in employing a negative going or trailing edge 44 of it, and it is to be noted that this trailing edge will vary in its time position as a function of the signal modulation. This trailing edge of the waveform, in waveform F, triggers "on" mono, or monostable multivibrator, 46 having an "on" time of approximately 50 nanoseconds, and its output is shown in waveform G. For purposes of illustration, while the pertinent leading or trailing edges of related waveforms are properly aligned, pulse widths and spacings (as indicated by break lines, spacings are 40 microseconds) are not related in scale. Thus, the leading edge of pulse waveform G corresponds in time to the trailing edge 44 (waveform F), and its time position within an average time between pulses of waveform G is varied as a function of the input modulation signal to comparator 28.

The output of mono 46 is applied through diode 48 across resistor 50 to the base input of NPN transistor 52 operated as a triggering amplifier. It is conventionally biased through resistor 54, e.g, 1.5 K ohms, from +5-volt terminal 31 of 5-volt power supply 30 to its collector. Capacitor 56, having an approximate capacitance of 01 mf, is connected between the collector and ground of transistor 52 to enable full bias potential to appear across the transistor for its brief turn-on interval, 50 nanoseconds. The output of transistor 52 is coupled between its emitter and ground to the primary 58 of trigger transformer 60. Additionally, transistor 52 may drive transformer 60 via an avalanche transistor connected in a common emitter configuration via a collector load resistor.

In order to drive transformer 60 with a steep wave front, an avalanche mode operated transistor is ideal. Identical secondary windings 62 and 64 of trigger transformer 60 separately supply base-emitter inputs of NPN avalanche, or avalanche mode operated, transistors 66 and 68 of power output stage 18. Although two are shown, one or more than two may be employed when appropriately coupled.

With avalanche mode operated transistors 66 and 68, it has been found that such mode is possible from a number of types of transistors not otherwise labeled as providing it, such as a 2N2222, particularly those with a metal can. The avalanche mode referred to is sometimes referred to as a second breakdown mode, and when transistors are operated in this mode and are triggered "on," their resistance rapidly goes quite low (internally at near the speed of light), and they will stay at this state until collector current drops sufficiently to cut off conduction (at a few microamperes). Certain other transistors, such as a type 2N4401, also display reliable avalanche characteristics.

As illustrated, impulse antenna 200 is charged by a DC source 65 through resistors 67 and 69 to an overall voltage which is the sum of the avalanche voltage of transistors 66 and 68 as discussed above. Resistors 67 and 69 together have a resistance value which will enable transistors 66 and 68 to be biased as described above. Resistors 71 and 73 are of relatively low value and are adjusted to receive energy below the frequency of cut-off of the antenna. In operation, when a pulse is applied to the primary 58 of pulse transformer 60, transistors 66 and 68 are turned "on," effectively shorting, through resistors 71 and 73, antenna elements 204 and 206. This action occurs extremely fast, with the result that a signal is generated generally as shown in pulse waveform G (but somewhat rounded). Antenna 200 differentiates the pulse G to transmit essentially a monocycle of the general shape shown in waveform H.

FIG. 1*a* illustrates an alternate embodiment of a transmitter output stage. It varies significantly from the one shown in FIG. 1 in that it employs a light-responsive avalanche transistor 63, e.g., a 2N3033. Similar components are designated with like numerical designations to that shown in FIG. 1, but with the suffix "a" added. Transistor 63 is triggered by laser diode or fast turn-on LED (light emitting diode) 61, in turn driven by avalanche transistor 52*a* generally operated as shown in FIG. 1. By employment of a light-activated avalanche or other avalanche mode operated semiconductor switches (now existing or soon appearing), or a series of them connected in series, it appears that the voltage for power source 65*a* may be elevated into the multi-kilovolt range, thus enabling a power output essentially as high as desired. In this respect, and as a particular feature of this invention, a light-triggered, gallium arsenide, avalanche mode operated switch would be employed.

Referring back to FIG. 1, the output of monocycle producing antenna 200, with elements 204 and 206, is typically transmitted over a discrete space and would typically be received by a like broadband antenna, e.g., antenna 200 of a receiver at a second location (FIG. 2).

FIG. 2 illustrates a radio receiver which is particularly adapted to receive and detect a time domain transmitted signal. In addition, it particularly illustrates a system for detecting intelligence which has been mixed with a particular offset or dither signal, analog or digital, such as provided by binary sequence "A" generator 33 shown in FIG. 1. It will thus be presumed for purposes of description that switch 39 of FIG. 1 is closed and that the signal transmitted by transmitter 10 is one wherein intelligence signals from microphone 34 are summed with the output of binary sequence "A" generator 33, and thus that the pulse position output of transmitter 10 is one wherein pulse position is a function of both intelligence and offset or dither signals. Thus, the transmitted signal may be described as a pulse position modulated signal subjected to changes in pulse position as effected by a time offset pattern of the binary sequence "A."

The transmitted signal from transmitter 10 is received by antenna 200 (FIG. 2), and this signal is fed to two basic circuits, demodulation circuit 222 and template generator 234. In accordance with this system, a replica of the transmitted signal, waveform H (FIG. 3), is employed to effect detection of the received signal, basic detection being accomplished in multiplier or multiplying mixer 226. For maximum response, the template signal, reproduced as waveform FIG. 4 $T_1$ in FIG. 4, must be applied to mixer 226 closely in phase with the input, as will be further described. As in the waveforms of FIG. 3, further references to the waveforms of FIG. 4 will not refer to the figure designation but will instead refer to the alphabetic designation of the waveforms. It will differ by a magnitude not perceptible in the waveforms of FIG. 4 as a function of modulation, effecting swings of approximately ±200 picoseconds, typically for a 1-nanosecond pulse. To accomplish such near synchronization, template generator 234 employs a crystal controlled but voltage controlled oscillator 227 which is operated by a control voltage which synchronizes its operation in terms of the received signal.

Oscillator 227 operates at a frequency which is substantially higher than the repetition rate of transmitter 10, and its output is divided down to the operating frequency of 25 kHz by frequency divider 230, thus equal to the output of divider 14 of transmitter 10.

In order to introduce a pattern of dither corresponding to that provided by binary sequence "A" generator 33, a like generator 228 provides a binary changing voltage to programmable delay circuit 232 which applies to the signal output of divider 230 a delay pattern corresponding to the one effected by binary sequence "A" generator 33 of FIG. 1 when added to intelligence modulation. Thus, for example, this might be four 8-bit binary words standing for the numerals 4, 2, 6, and 8, the same pattern having been generated by binary sequence "A" generator 33 and transmitted by transmitter 10. It is further assumed that this is a repeating binary pattern. Thus, programmable delay 232 will first delay a pulse it receives from divider 230 by four units. Next, the same thing would be done for the numeral 2, and so on, until the four-numeral sequence has been completed. Then, the sequence would start over. In order for the two binary sequence generators to be operated in synchronization, either the start-up time of the sequence must be communicated to the receiver, or else signal sampling would be for a sufficient number of signal input pulses to establish synchronization by operation of the synchronization system, as will be described. While a repeatable sequence is suggested, it need not be such so long as there is synchronization between the two generators, as by transmission of a sequence start signal and the provision in the receiver of means for detecting and employing it.

Either programmable delay 232 or a second delay device connected to its output would additionally provide a general circuit delay to take care of circuit delays which are inherent in the related circuitry with which it is operated, as will be described. In any event, the delayed output of delay 232, which is a composite of these, will be provided to the input of template generator 234, and it is adapted to generate a replica of the transmitted signal, illustrated in FIG. 4 $T_1$. Differential amplifier 246 basically functions to provide a DC voltage as needed to apply a correction or error signal to oscillator 227 as will enable there to be provided to mixer 226 replica signal $T_1$ exactly in phase with the average time of input signal $E_a$.

In order to generate the nearest signal, the input signal $E_a$ is multiplied by two spaced, in time, replicas of the template signal output of template generator 234. The first of these, indicated as $T_1$, is multiplied in mixer 236 by input signal $E_a$ in mixer 238. As will be noted in FIG. 4, $T_2$ is delayed from signal $T_1$ by delay 240 by a period of essentially one-half of the duration of the major lobe P of template signal $T_1$.

The output of mixer 236 is integrated in integrator 242, and its output is sampled and held by sample and hold unit 244 as triggered by delay 232. The output of sample and hold unit 244, the integral of the product of the input signal $E_a$ and $T_1$, is applied to the non-inverting input of differential amplifier 246. Similarly, the output of mixer 238 is integrated by integrator 249 and sampled and held by sample and hold 250 as triggered by delay 232, and the integrated product of the input signal $E_a$ and template signal $T_2$ is applied to the inverting input of differential amplifier 246.

To examine the operation of differential amplifier 246, it will be noted that if the phase of the output of oscillator 227 should advance, signals $T_1$ and $E_a$ applied to mixer 236 would become closer in phase, and their product would increase, resulting in an increase in input signal to the non-inverting input of differential amplifier 246, whereas the advance effect. on template signal $T_2$ relative to the input signal $E_a$ would be such that their coincidence would decrease, causing a decrease in the product output of mixer 238 and therefore a decreased. voltage input to the inverting input of differential amplifier 246. As a result, the output of differential amplifier 246 would be driven in a positive direction, and this polarity signal would be such as to cause oscillator 227 to retard. If the change were in the opposite direction, the result would be such that higher voltages would be applied to the inverting input than to the non-inverting input of differential amplifier 246, causing the output signal to decrease and to drive oscillator 227 in an opposite direction. In this manner, the near average phase lock is effected between the input signal $E_a$ and template signal $T_a$ which is directly employed in the modulation of the input signal. The term "near" is used in that the output of differential amplifier 246 is passed through low pass filter 253 before being applied to the control input of oscillator 227. The cut-off frequency of low pass filter 253 is set such that it will take a fairly large number of pulses to effect phase shift (e.g., 10 Hz to perhaps down to 0.001 Hz). As a result, the response of oscillator 227 is such that it provides an output which causes waveform $T_1$ and thus waveform $T_a$ to be non-variable in position with respect to modulation effect. With this limitation in mind, and in order to obtain a synchronous detection of the input signal, the output $T_1$ of template generator 234 is delayed by a period equal to essentially one-fourth the period P of the major lobe of the template and input signal, and this is applied as signal $T_a$ with the input signal $E_a$, to multiplying mixer 226. As will be noted, the resulting delayed signal, $T_a$, is now near synchronization with the input signal $E_a$, and thus the output of multiplier 226 provides essentially a maximum signal output. In instances where there is simply no signal, or a noise signal, at the signal input of mixer 226, there would be between input signals $E_a$ an elapsed time of exactly 40 milliseconds shown in FIG. 4, and a quite minimum deviation in output would appear from mixer 226.

The signal output of mixer 226 is integrated in integrator 251, and the output signal is multiplied by a factor of 0.5 by amplifier 252. Then this one-half voltage output of amplifier 252 is applied to the inverting input of comparator 254, and this voltage represents one-half of the peak output of integrator 250. At the same time, a second output of integrator 251 is fed through delay 256 to the non-inverting input of comparator 254, delay being such as required for stabilization of the operation of amplifier 252 and comparator 254 in order to obtain an effective comparison signal level that will be essentially free of the variable operation of these two units. The output of comparator 254 represents an essentially precise time marker which varies with the position of input signal $E_a$. It is then fed to the reset input of flip-flop 258, a set input being provided from the output of delay 232 which represents, because of low pass filter 253, an averaged spacing between input signals, thus providing a reference against which the modulation controlled time variable output signal of comparator 254 may be related. It is related by virtue of the output of delay 232 being provided as the set input of flip-flop 258. Thus, for example, the output of flip-flop 258 would rise at a consistent time related to the average repetition rate a essentially dictated by low pass filter 253. Thus, the output of flip-flop 258 would be brought back to zero at a time which reflected the intelligence modulation on the input signal. Thus, we would have a pulse height of a constant amplitude, but with a pulse width which varied directly with modulation. The output of flip-flop 258 is then fed through low pass filter 260, which translates the signal from pulse width demodulation to amplitude signal modulation, which is then reproduced by loudspeaker 262 with switch A in the upper position.

Where the intelligence transmission is in digital form, switch A is moved to the lower position wherein the output of comparator 261*a* and the thus parallel in form digital signal is fed to the non-inverting input of comparator 261*a*, a, potential being applied to the inverting input sufficient to block the transition of comparator 261*a* from an off state to an on state absent a significant "1" binary signal. Assuming that the digital signal is a converted analog signal and the signal is representative of an analog voice input as shown in FIG. 1, switch B will be positioned in the indicated position wherein the output of comparator 261*a* is fed to D-A converter 261*b*, and the thus derived analog signal is fed via switch C in the lower position to loudspeaker 262.

In the event that the digital transmission is derived from another digital source, such as illustrated by digital source 29 in FIG. 1, which might be a computer, switch B is switched from its shown position to its lower position, wherein the output of comparator 261*a* is fed in a serial-to-parallel converter 261*d* to digital regsiter 261*c*, such as another digital computer or a digital computer terminated by a monitor. Thus, in this configuration, purely transmitted digital signals would be processed in purely digital form. In this case, switch C would be moved to its upper position as no signal is being transmitted to it.

While the generation and detection of digital signals have been described in terms of binary encoding, it is to be appreciated that multi-level encoding might be employed and detected wherein discretely positioned bits would be represented by different effected delays and encoded in this manner.

Assuming that binary sequence "A" generator 33 of transmitter 10 and binary sequence "A" generator 228 for the receiver are operated essentially in synchronization, the effect of the time position dither effected by generator 33 of transmitter 10 will have no dislocating effect on the signal.

As suggested above, in order to ensure synchronization, some form of signaling between the transmitter and receiver as to the starting of the binary sequence generator, generator 33, is required. This may be done by an auxiliary transmitter or by a decoding arrangement wherein there would be provided at the conclusion of, say, one sequence of binary sequence generator 33, a start signal for binary sequence generator 228 of the receiver. Absent this, in the free running mode, there would be effected synchronization by the operation of template generator 234 which, for short codes, and with relatively low noise levels, would be relatively short; and for longer codes, or instances where noise was a significant problem, longer codes would be required for synchronization. Where needed, a receiving station might transmit back to the original transmitting station an acknowledgment that synchronization has been achieved.

From the foregoing, it should be appreciated that applicant has provided both an inexpensive and practical time domain system for communications. While a system has been described wherein a single short pulse, for example, a nanosecond, is transmitted at a repetition rate such that 40 microseconds is between pulses, the invention contemplates that a group of pulses might be sent which would be separated by the longer period. Thus, for example, an 8-bit set might be transmitted as a group wherein there was simply room between the pulses to detect their multiposition shifts with modulation. By this arrangement, it is to be appreciated that intelligence information transmitted would be increased by up to 256 times, or the immunity from noise could be substantially improved by this technique and related ones.

Figure 5:
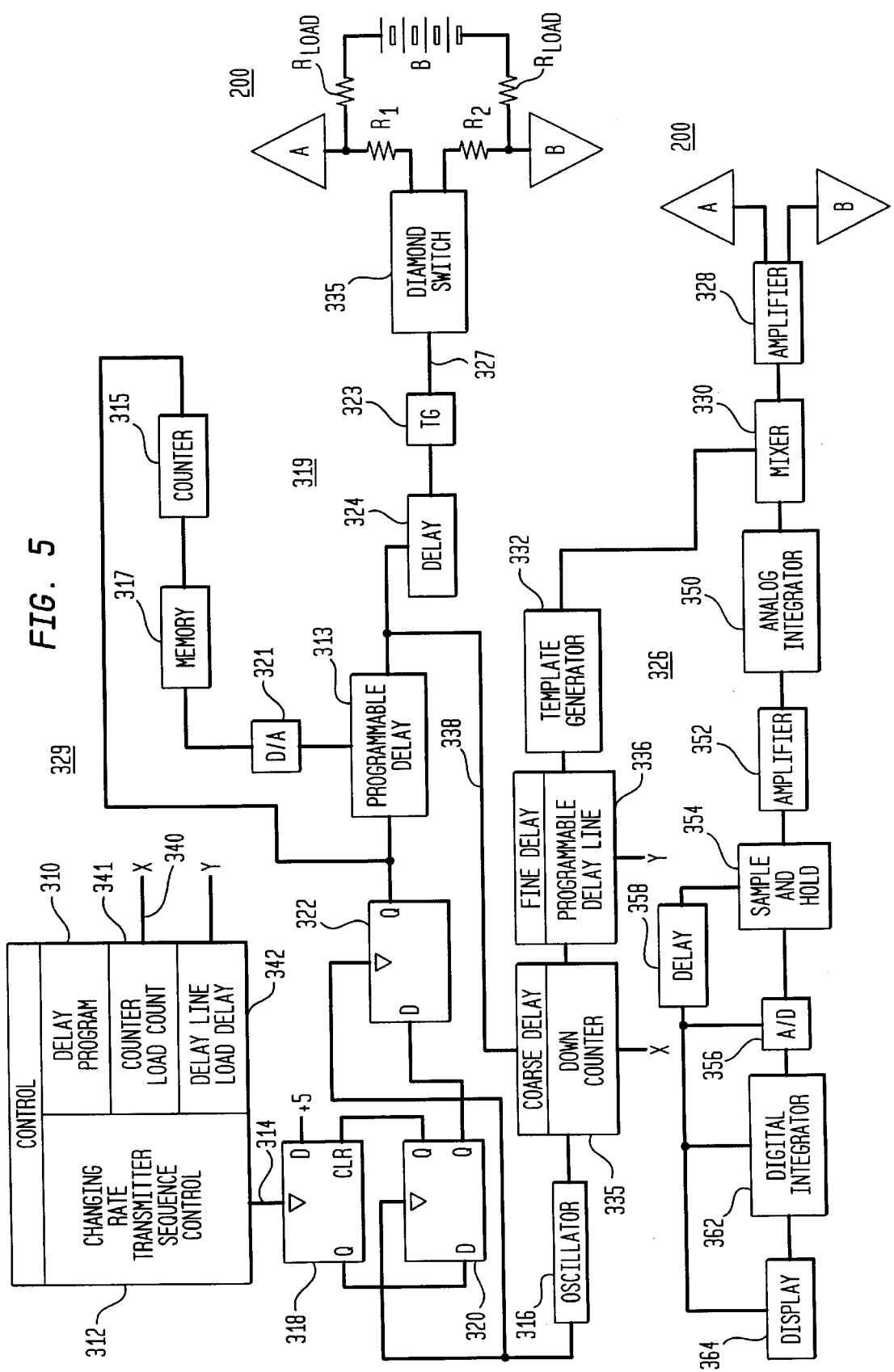
FIG. 5 is an electrical block diagram illustrative of a basic radar system constructed in accordance with this invention.
Figure 8A:
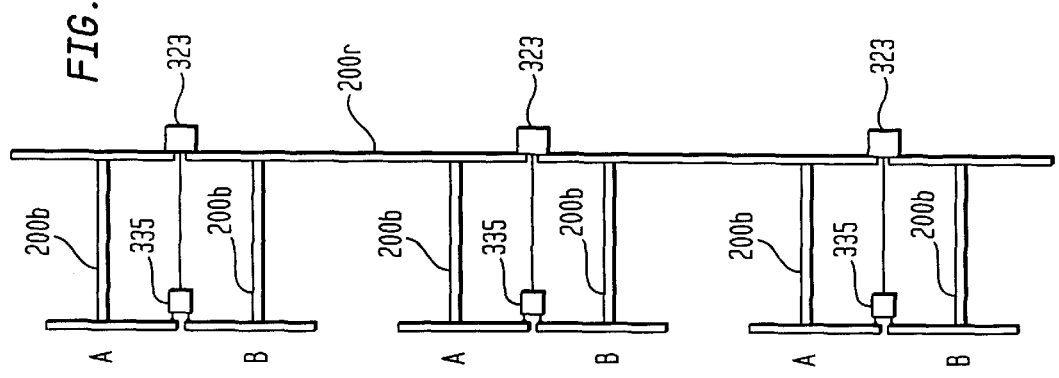
FIG. 8a and FIG. 8b show side and front views, respectively, of an alternate form of antenna constructed in accordance with this invention.
Figure 8B:
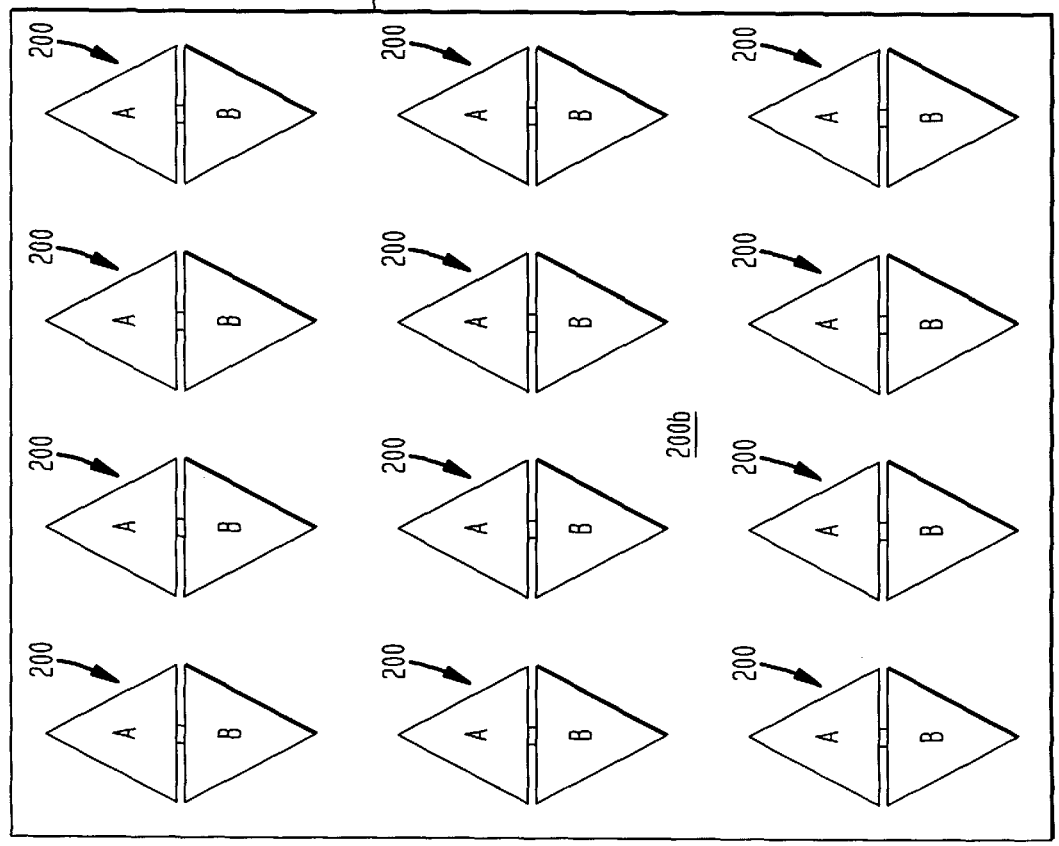

FIG. 5 particularly illustrates a radar system of the present invention for determining range. Impulse-responsive, or impulse, antenna 200, or antenna 201 as shown in FIG. 6a, of transmitter 329 comprises triangular elements A and B with closely spaced bases. A dimension of a base and a dimension normal to the base of each element is approximately 4½ inches and is further discussed and illustrated with respect to FIGS. 6 and 7. Typically, a reflector would be used as illustrated in FIGS. 8a and 8b. Alternately, as shown in FIG. 6a, a base is reduced to 2¼ inches wherein the elements are halved as shown in FIG. 6a. Significantly, however, the length of path from a feed point to an edge is the same in both cases.

The transmitter is basically controlled by control 310. It includes a transmit sequence, or rate, control portion 312 which determines the timing of transmitted signal bursts, at, for example, 10,000 bursts per second, in which case transmit sequence control 312 generates an output at 10,000 Hz on lead 314. Oscillator 316 is operated at a higher rate, for example, 20 mHz.

The signal output of transmit sequence control 312 is employed to select particular pulse outputs of oscillator 316 to be the actual pulse which is used as a master pulse for controlling both the output of transmitter 329 and the timing of receiver functions, as will be further described. In order to unambiguously and repetitively select an operative pulse with low timing uncertainty from oscillator 316, the selection is one and some fraction of an oscillator pulse interval after an initial signal from control 312. The selection is made via a control sequence employing D-type flip-flops 318, 320, and 322. Thus, the transmit sequence control pulse on lead 314 is applied to the clock input of flip-flop 318. This causes the Q output of flip-flop 318 to transition to a high state, and this is applied to a D input of flip-flop 320. Subsequently, the output of oscillator 316 imposes a rising edge on the clock input of flip-flop 320. At that time, the high level of the D input of this flip-flop is transferred to the Q output. Similarly, the Q output of flip-flop 320 is provided to the D input of flip-flop 322, and the next rising edge of the pulse from oscillator 316 will cause the not Q output of flip-flop 322 to go low and thus initiate the beginning of the transmit-receive cycle.

For the transmit mode, the not Q output of flip-flop 322 is fed as an input to analog programmable delay 313 and to counter 315. Counter 315, for example, would respond to the not Q outputs of flip-flop 322 and count up to a selected number, for example, 356, and recycle to count again. Its binary output would be fed as an address to memory unit 317, ROM or RAM, which would have stored, either in numerical address order, or randomly selected order, a number. As a result, upon being addressed, a discrete output number would be fed to D/A converter unit 321. D/A converter unit 321 would then provide an analog signal output proportional to the input number. This output is employed to sequentially operate programmable delay unit 313 for delays of pulses from flip-flop 322 by an amount proportional to the signal from D/A converter 321. The range of delays would typically be up to the nominal timing between pulses, in this case, up to 300 nanoseconds, and practically up to 99 nanoseconds. The delayed output of programmable delay unit 313 is then fed to fixed delay unit 324, which provides a fixed delay of 200 nanoseconds to each pulse that it receives. The thus delayed pulses are then fed to trigger generator 323. Trigger generator 323, e.g., an avalanche mode operated transistor, would provide a sharply rising electrical output at the 10,000 Hz rate or a like response of light output, e.g., by laser, depending upon the transmitter to be driven. In accordance with one feature of this invention, trigger generator 323 would be an ultraviolet laser. In any event, a pulse of trigger generator 323 is fed to and rapidly turns "on" a switch, for example, diamond 335, which, for example, may again be an electrically operated or light operated switch, such as a diamond switch in response to the ultraviolet laser triggering device via fiber optic 327. Importantly, it must be capable of switching in a period of a nanosecond or less. It is then switched "on" to discharge antenna 200, having earlier been charged from power source B through resistors $R_1$ and $R_2$, source B being, for example, 100 to 5,000 volts.

Conformal impulse antenna 200 or 200a (FIG. 6a) is turned "on" or turned "off," or successively both, by switch assembly 319 which applies stepped voltage changes to the antenna. It responds by transmitting essentially short burst signals each time that it is triggered. These burst signals are then transmitted into space via a directional version of antenna 200 as illustrated in FIGS. 8a, 8b and 9a, 9b or simply by an omnidirectional. antenna as shown by antenna 200 in FIG. 1 or 200a in FIG. 6a.

Signal returns from a target would be received by receiver 326, typically located near or together with transmitter 329, via receiving antenna 200, which would, for example, be like a transmitting antenna. The received signals are amplified in amplifier 328 and fed to mixer 330, together with a signal from template generator 332, driven by delay line 336, which is timed to produce signals, typically half cycles in configuration, and corresponding in time to the anticipated time of arrival of a signal from a target at a selected range.

Mixer 330 functions to multiply the two input signals, and where there are coincidence signals, timewise and with like or unlike polarity coincident signals, there is a significant and integratable output, indicating a target at the range. A mixer and the following circuitry may be reused for later arriving signals representative of different range, this range or time spacing being sufficient to complete processing time for reception and integration at a range as will be described. Additional like mixtures and following circuitry sets may be employed to fill in the range slots between that capable for one set.

Since the goal here is to determine the presence or absence of a target based on a number of signal samplings as effected by integration, where a true target does not exist, the appearance of signals received by mixer 330 corresponding to the time of receipt of signals from template generator 332 will typically produce signals which vary not only in amplitude, but also in polarity. It is to be borne in mind that the present system determines intelligence, not instantaneously, but after a period of time, responsive to a preponderance of coherent signals over time, a facet of time domain transmission. Next, it is significant that the template generator produce a template signal burst which is no longer than the effecting signal to be received and bear a consistent like or opposite polarity relationship in time with it. As suggested above, received signals which do not bear this relation to the template signal will be substantially attenuated. As one signal, the template signal is simply a one polarity burst signal. Assuming that it maintains the time relationship described, effective detection can be effected.

For purposes of illustration, we are concerned with looking at a single time slot for anticipated signal returns following signal bursts from transmitting and receiving antennas 200. Accordingly, template generator 332 is driven as a function of the timing of the transmitter. To accomplish this, coarse delay counter 335 and fine delay programmable delay line 336 are employed. Down counter 335 counts down the number of pulse outputs from oscillator 316 which occur subsequent to a control input of lead 338, the output of programmable delay unit 313. A discrete number of pulses thereafter received from oscillator 316 is programmable in down counter 335 by an output X from load counter 341 on lead 340 of control 310, a conventional device wherein a binary count is generated in control 310 which is loaded into down counter 335. As an example, we will assume that it is desired to look at a return which occurs 175 nanoseconds after the transmission of a signal from antenna 200. To accomplish this, we load into down counter 335 the number "7," which means it will count seven of the pulse outputs of oscillator 316, each being spaced at 50 nanoseconds. So there is achieved a 350-nanosecond delay in down counter 335, but subtracting 200 nanoseconds as injected by delay unit 324, we will have really an output of down counter 335 occurring 150 nanoseconds after the transmission of a burst by transmitting antenna 200 or 200a. In order to obtain the precise timing of 175 nanoseconds, an additional delay is effected by programmable delay line 336, which is triggered by the output of down counter 335 when its seven count is concluded. It is programmed in a conventional manner by load delay 342 of control 310 of lead Y and, thus in the example described, would have programmed programmable delay line 336 to delay an input pulse provided to it by 25 nanoseconds. In this manner, programmable delay line 336 provides a pulse output to template generator 332, 175 nanoseconds after it is transmitted by transmitting antenna 200. Template generator 332 is thus timed to provide, for example, a positive half cycle or square wave pulse to mixer 330 or a discrete sequence or pattern of positive and negative excursions.

The output of mixer 330 is fed to analog integrator 350. Assuming that there is a discrete net polarity likeness or unlikeness between the template signal and received signal during the timed presence of the template signal, analog integrator 350, which effectively integrates over the period of template signal, will provide a discrete voltage output. If the signal received is not biased with a target signal imposed on it, it will generally comprise as much positive content as negative content on a time basis; and thus when multiplied with the template signal, the product will follow this; characteristic, and likewise, at the output of integrator 350, there will be as many discrete products which are positive as negative. On the other hand, with target signal content, there will be a bias in one direction or the other, that is, there will be more signal outputs of analog integrator 350 that are of one polarity than another. The signal output of analog integrator 350 is amplified in amplifier 352, and then, synchronously with the multiplication process, discrete signals emanating from analog integrator 350 are discretely sampled and held by sample and hold 354. These samples are then fed to A/D converter 356 which digitizes each sample, effecting this after a fixed delay of 40 nanoseconds provided by delay unit 358, which takes into account the processing time required by sample and hold unit 354. The now discrete, digitally calibrated positive and negative signal values are fed from A/D converter 356 to digital integrator 362, which then digitally sums them to determine whether or not there is a significant net voltage of one polarity or another, indicating, if such is the case, that a target is present at a selected range. Typically, a number of transmissions would be effected in sequence, for example, 10, 100, or even 1,000 transmissions, wherein the same signal transmit time of reception would be observed, and any signals occurring during like transmissions would then be integrated in digital integrator 362, and in this way enable recovery of signals from ambient, non-synchronized signals which, because of random polarities, do not effectively integrate.

The output of digital integrator 362 would be displayed on display 364, synchronized in time by an appropriate signal from delay line 336 (and delay 358) which would thus enable the time or distance position of a signal return to be displayed in terms of distance from the radar unit.

FIGS. 6 and 7 illustrate side and front views of an antenna 200. As is to be noted, antenna elements A and B are triangular with closely adjacent bases, and switch 335 connects close to the bases of the elements as shown. As an example, and as described above, it has been found that good quality burst signals can be radiated from impulses having a stepped voltage change occurring in one nanosecond or less wherein the base of each element is approximately 4½ inches, and the height of each element is approximately the same. Alternately, the antenna may be, as in all cases, like that shown in FIG. 6a where antenna. 200a is sliced in half to have a base dimension of 2¼ inches. Either of the antennas illustrated in FIG. 6, 8, or 6a may be employed as antennas in any of the figures.

FIGS. 8a and 8b diagrammatically illustrate an antenna assembly wherein a multiple, in this case, 12, separate antenna element sets, for example, as antenna 200, are employed, each being spaced forward of a metal reflector 200R by a distance of approximately 3 inches, for a nine-inch tip-to-tip antenna element dimension. The antennas are supported by insulating standoffs 200b, and switches 335 (transmitting mode) are shown to be fed by triggering sources 323 which conveniently can be on the back side of reflector 200R, and thus any stray radiation which might tend to flow back beyond this location to a transmission line is effectively shielded. The multiple antennas may be operated in unison, that is, all of them being triggered (in the case of a transmitter) and combined (in the case of a receiver)

with like timing, in which case the antenna would have a view or path normal to the antenna array or surface of reflector as a whole. Alternately, where it is desired to effect beam steering, the timing by combination, or triggering devices (receiving or transmitting), would be varied. Thus, for example, with respect to reception, while the outputs of all of the antennas in a column might be combined at a like time point, outputs from other columns might be delayed before a final combination of all signals. Delays can simply be determined by lead lengths, and, in general, multiple effects are achievable in almost limitless combinations.

Figure 9B:
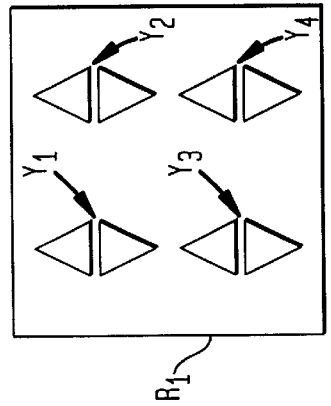
FIGS. 9a and 9b diagrammatically show side and front views, respectively, of another alternate embodiment of an antenna array.
Figure 9A:
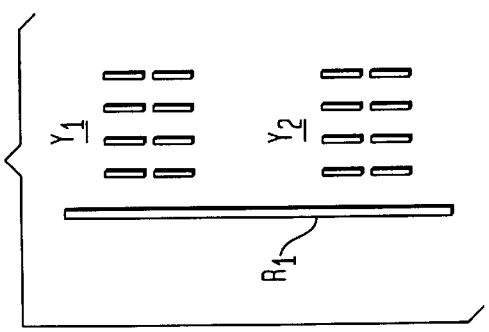

Alternately, antenna elements may be arranged in an end-fire format wherein each element is driven with or without a reflector. They may be arrayed as illustrated in FIGS. 9a and 9b wherein four end-fire unit $Y_1$, $Y_2$, $Y_3$, and $Y_4$ are employed and positioned in front of a common reflector. Alternately, the reflector may be omitted, and further alternately, an absorber may be positioned behind the array.

FIG. 10 diagrammatically illustrates a transmitting switch wherein the basic switching element is an avalanche mode operated transistor 400, the emitter and collector of which are connected through like resistors 402 to antenna elements A and B of antenna 200, the resistors being, for example, 25 ohms each (for an antenna as shown in FIG. 6a, it would be doubled). In the time between the triggering "on" of avalanche transistor 400, it is charged to a DC voltage, e.g., 150 volts, which is coordinate with the avalanche operating point of transistor 400. Charging is effected from (+) and (−) supply terminals through like resistors 404 to antenna elements A and B. The primary of pulse transformer 408 is supplied a triggering pulse, as from trigger circuit 323 of FIG. 5, and its secondary is connected between the base and emitter of transistor 400. Typically, the transmission line for the triggering pulse would be in the form of a coaxial cable 410. When triggered "on," transistor 400 shorts antenna elements A and B and produces a signal transmission from antenna 200 (or antenna 200a).

FIG. 11 illustrates a modified form of applying a charging voltage to antenna elements A and B, in this case, via constant. current source, and wherein the charging voltage is supplied. across capacitor 507 through coaxial cable 412, which also supplies a triggering voltage to transformer 408, connected as described above. For example, the (+) voltage is supplied to the inner conductor of coaxial cable 412, typically from a remote location (not shown). This voltage is then coupled from the inner conductor of the coaxial cable through the secondary of pulse transformer 408 and resistor 414, e.g., having a value of 1 K ohms, to the collector of a transistor 416 having the capability of standing the bias voltage being applied to switching transistor 400 (e.g., 150 volts). The (+) voltage is also applied through resistor 418, for example, having a value of 220 K ohms, to the base of transistor 416. A control circuit to effect constant current control is formed by a Zener diode 420, across which is capacitor 422, this Zener diode setting a selected voltage across it, for example, 7½ volts. This voltage is then applied through a variable resistor 424 to the emitter of transistor 416 to set a constant voltage between the base and emitter and thereby a constant current rate of flow through the emitter-collector circuit of transistor 416, and thus such to the antenna. Typically, it is set to effect a full voltage charge on antenna 200 in approximately 90% of the time between switch discharges by transistor 400. The thus regulated charging current is fed through resistors 406 to antenna elements A and B. In this case, discharge matching load resistors 402 are directly connected between transistor 400 and antenna elements A and B as shown.

FIG. 12 illustrates the employment of a light responsive element as a switch, such as a light responsive avalanche transistor 423, alternately a bulk semiconductor device, or a bulk crystalline material such as diamond, would be employed as a switch, there being switching terminals across, on opposite sides of, the bulk material. The drive circuit would be similar to that shown in FIG. 10 except that instead of an electrical triggering system, a fiber optic 426 would provide a light input to the light responsive material, which would provide a fast change from high to low resistance between terminals to effect switching.

FIG. 13 bears similarity to both FIGS. 11 and 12 in that it employs a constant current power source with light responsive switching element 423, such as a light responsive transistor, as shown. Since there is no coaxial cable for bringing in triggering signals, other means must be provided for bias voltage. In some applications, this may simply be a battery with a DC-to-DC converter to provide the desired high voltage source at (+) and (−) terminals.

FIGS. 14 and 15 illustrate the employment of multiple switching elements, actually there being shown in each figure two avalanche mode operated transistors 450 and 452 connected collector-emitter in series with resistors 402 and antenna elements A and B. As will be noted, separate transformer secondary windings of trigger transformer 454 are employed to separately trigger the avalanche mode transistors. The primary winding of a transformer would typically be fed via a coaxial cable as particularly illustrated in FIG. 10. Antenna elements A and B (either 200 or 200a) are charged between occurrences of discharge from (+) or (−) supply terminals, as shown.

FIG. 15 additionally illustrates the employment of a constant current source as described for the embodiment shown in FIGS. 11 and 13. Actually, the system of feeding the constant current source through coaxial cable as shown in FIG. 11 can likewise be employed with the circuitry shown in FIG. 14.

Figure 16:
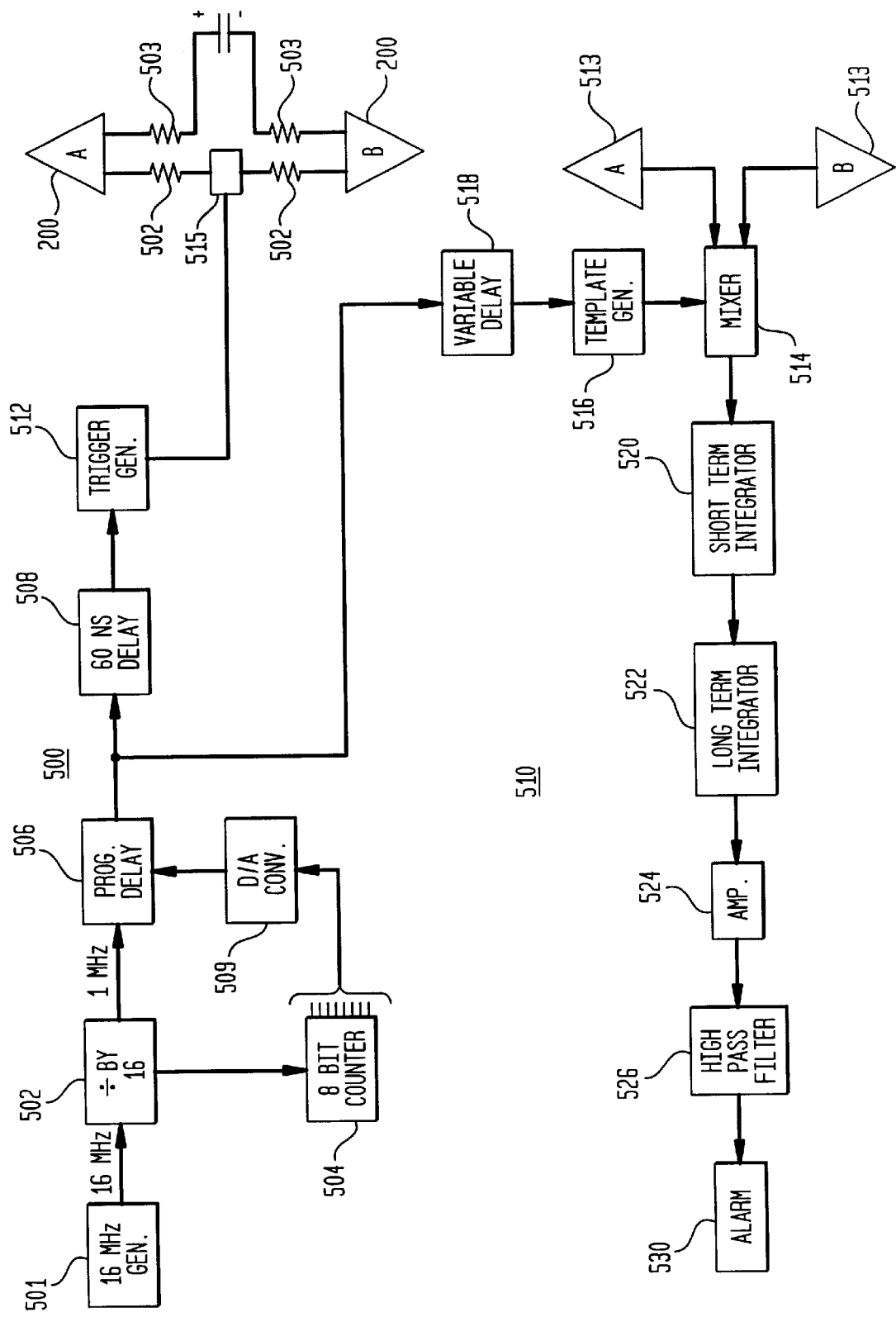
FIG. 16 illustrates a radar system particularly for employment in facility surveillance.

Referring to FIG. 16, there is illustrated a radar system particularly intended for facility surveillance, and particularly for the detection of moving targets, typically people. Transmitter 500 includes a 16-mHz clock signal which is generated by signal generator 501. This signal is then fed to ÷16 divider 502 to provide output signals of 1 mHz. One of these 1-mHz outputs is fed to 8-bit counter 504 which counts up to 256 and repeats. The other 1-mHz output of ÷16 divider 502 is fed through a programmable analog delay unit 506 wherein each pulse is delayed by an amount proportional to an applied analog control signal. Analog delay unit 506 is controlled by a magnitude of count from counter 504, which is converted to an analog voltage proportional to this count by D/A converter 509 and applied to a control input of analog delay unit 506.

By this arrangement, each of the 1-mHz pulses from ÷16 divider 502 is delayed a discrete amount. The pulse is then fed to fixed delay unit 508 which, for example, delays each pulse by 60 nanoseconds in order to enable sufficient processing time of signal returns by receiver 510. The output of fixed delay unit 508 is fed to trigger generator 512, for example, an avalanche mode operated transistor, which provides a fast rise time pulse. Its output is applied to switch 514, typically an avalanche mode operated transistor as illustrated in FIG. 10 or 11. Antenna 200 (or 200a) is directly charged through resistors 503 from a capacitor 507 (FIG. 11) which generally holds a supply voltage provided at the (+) and (−) terminals.

Considering now receiver 510, antenna 513, identical with antenna 200 or 200a, receives signal returns and supplies them to mixer 514. Mixer 514 multiplies the received signals from antenna 513 with locally generated ones from template generator 516. Template generator 516 is triggered via a delay chain circuitry of analog delay unit 506 and adjustable delay unit 518, which is set to achieve generation of a template signal at a time corresponding to the sum of delays achieved by fixed delay 508 and elapsed time to and from a target at a selected distance. The output of mixer 514 is fed to short-term analog integrator 520 which discretely integrates for the period of each template signal. Its output is then fed to long-term integrator 522 which, for example, may be an active low pass filter and integrates over on the order of 50 milliseconds, or, in terms of signal transmissions, up to, for example, approximately 50,000 such transmissions. The output of integrator 522 is amplified in amplifier 524 and passed through adjustable high pass filter 526 to alarm 530. By this arrangement, only AC signals corresponding to moving targets are passed through the filters and with high pass filter 526 establishing the lower velocity limit for a target and low pass filter 522 determining the higher velocity of a target. For example, high pass filter 526 might be set to pass signals from targets at a greater velocity than 0.1 feet per second and integrator-low pass filter 522 adapted to pass signals representing targets moving less than 50 miles per hour. Assuming that the return signals pass both such filters, the visual alarm would be operated.

Figure 17:
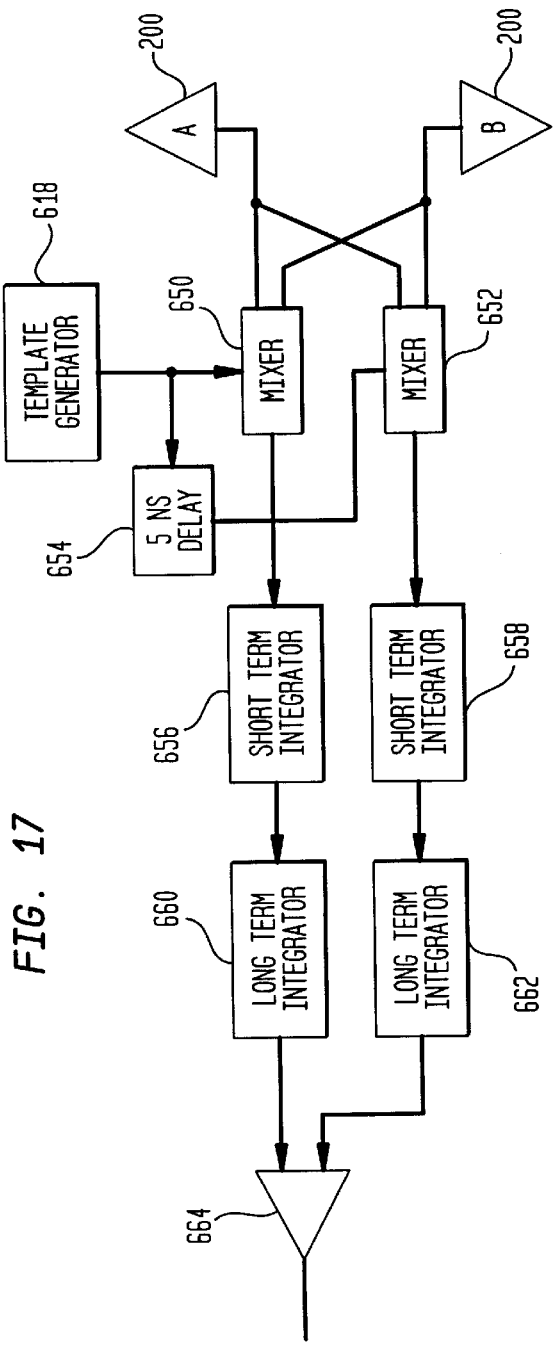
FIG. 17 illustrates a modification of this radar system.

FIG. 17 illustrates a modification of FIG. 16 for the front-end portion of receiver 510. As will be noted, there are two outputs of antenna 200, one to each of separate mixers 650 and 652, mixer 650 being fed directly an output from template generator 618, and mixer 652 being fed an output from template generator 618 which is delayed 0.5 nanosecond by 0.5 nanosecond delay unit 654. The outputs of mixers 650 and 652 are then separately integrated in short-term integrators 656 and 658, respectively. Thereafter, the output of each of these short-term integrators is fed to separate long-term integrators 660 and 662, after which their outputs are combined in differential amplifier 664. The output of differential amplifier 664 is then fed to high pass filter 526 and then to alarm 530, as discussed above with respect to FIG. 16. Alternately, a single long-term integrator may replace the two, being placed after differential amplifier 664.

By this technique, there is achieved real time differentiation between broad boundary objects, such as trees, and sharp boundary objects, such as a person. Thus, assuming that in one instance the composite return provides a discrete signal and later, for example, half a nanosecond later, there was no change in the scene, then there would be a constant difference in the outputs of mixers 650 and 652. However, in the event that a change occurred, as by movement of a person, there would be changes in difference between the signals occurring at the two different times, and thus there would be a difference in the output of differential amplifier 664. This output would then be fed to high pass filter 526 (FIG. 16) and would present a discrete change in the signal which would, assuming that it met the requirements of high pass and filter 526 and integrator-low pass filters 660 and 662 (FIG. 17), be signalled by alarm 530.

In terms of a system as illustrated in FIG. 16, it has been able to detect and discriminate very sensitively, sensing when there was a moving object within the bounds of velocities described and within the range of operation, several hundred feet or more. For example, movement of an object within approximately a ±1-foot range of a selected perimeter of measurement is examinable, leaving out sensitivity at other distances which are neither critical nor desirable in operation. In fact, this feature basically separates the option of this system from prior systems in general as it alleviates their basic problem: committing false alarms. Thus, for example, the present system may be positioned within a building and set to detect movement within a circular perimeter within the building through which an intruder must pass. The system would be insensitive to passersby just outside the building. On the other hand, if it is desirable to detect people approaching the building, or, for that matter, approaching objects inside or outside the building, then it is only necessary to set the range setting for the perimeter of interest. In general, walls present no barrier. In fact, in one test, an approximately 4-foot thickness of stacked paper was within the perimeter. In this test, movement of a person just on the other side of this barrier at the perimeter was detected.

While the operation thus described involves a single perimeter, by a simple manual or automatic adjustment, observations at different ranges can be accomplished. Ranges can be in terms of a circular perimeter, or, as by the employment of a directional antenna (antenna 200 with a reflector) or yagi-type array, effect observations at a discrete arc.

Figure 18:
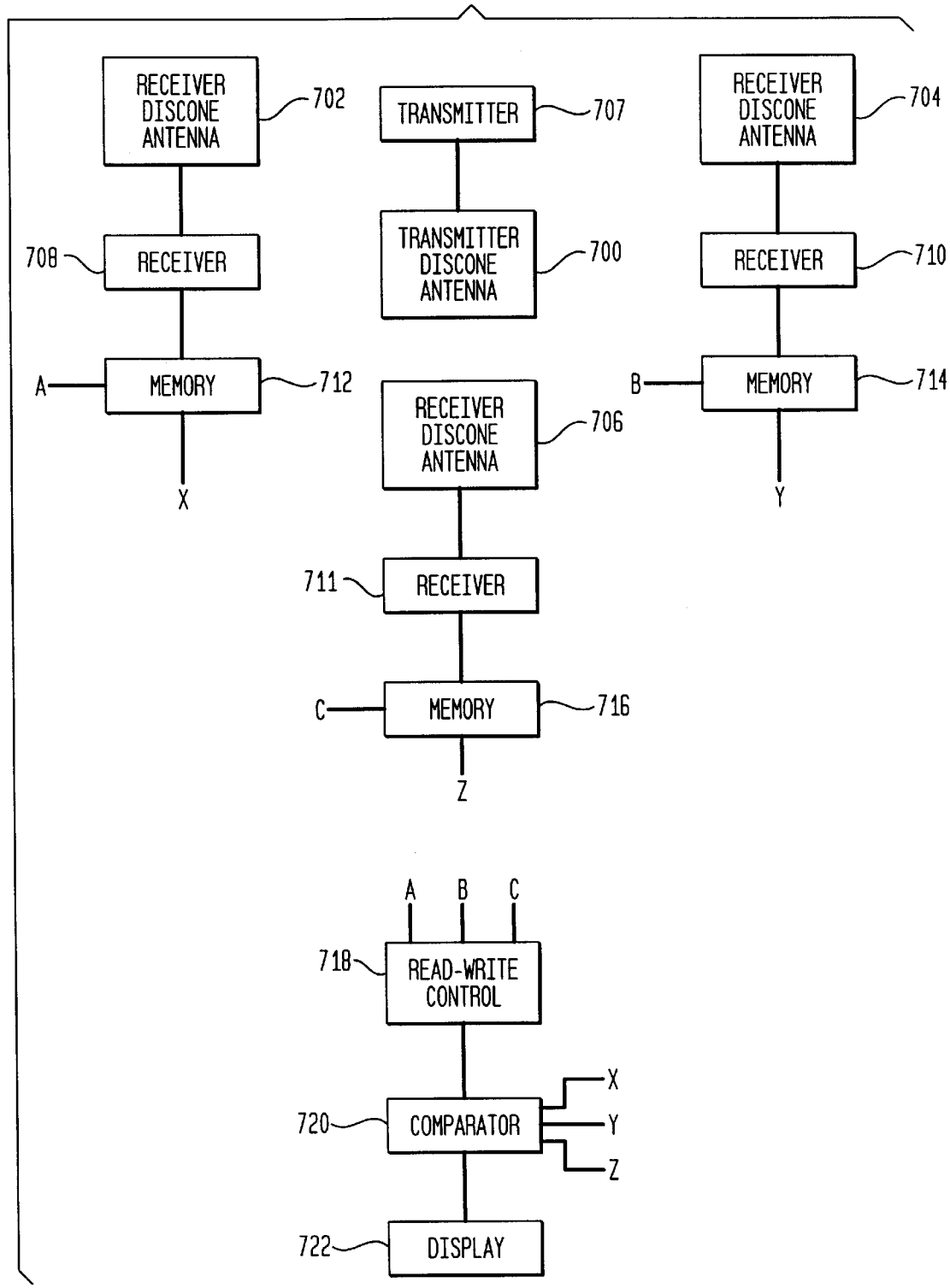

FIG. 18 illustrates an application of applicant's radar to a directional operation which might cover a circular area, for example, from 20 to 30 feet to several thousand feet in radius. In this illustration, it is assumed that there is positioned at a selected central location a transmit antenna, in this case, oriented vertically as a non-directional, or omnidirectional, antenna 700. There are then positioned at 120° points around it like received antennas 702, 704, and 706. An antenna, e.g., as previously described, is powered by a trigger switch transmitter 707. Assuming that a single signal burst is transmitted from transmit antenna 700, it would be radiated around 360° and into space. At some selected time as discussed above, receivers 708, 710, and 711 would be supplied a template signal as described above to thus, in effect, cause the receivers to sample a signal echo being received at that precise instant. This process would be repeated for incrementally increasing or deceasing times, and thus there would be stored in the memory's units 712, 714, and 716 signals representative of a range of transit times. Then, by selection of a combination of transit times for each of the receivers, in terms of triangularizations, it is possible to select stored signals from the memory units representative of a particular location in space. For surveillance purposes, the result of signals derived from one scan and a later occurring scan would be digitally subtracted, and thus there an object at some point within the range of the unit has moved to a new location, there will then be a difference in the scan information. This thus would signal that something may have entered the area. This process in general would be controlled by a read-write control 718 which would control the memory's units 712, 714, and 716 and would control a comparator 720 which would receive selected values X, Y, and Z from memory units 712, 714, and 716 to make the subtraction. Display 722, such as an oscilloscope, may be employed to display the relative position of an object change with respect to a radar location.

Figure 19:
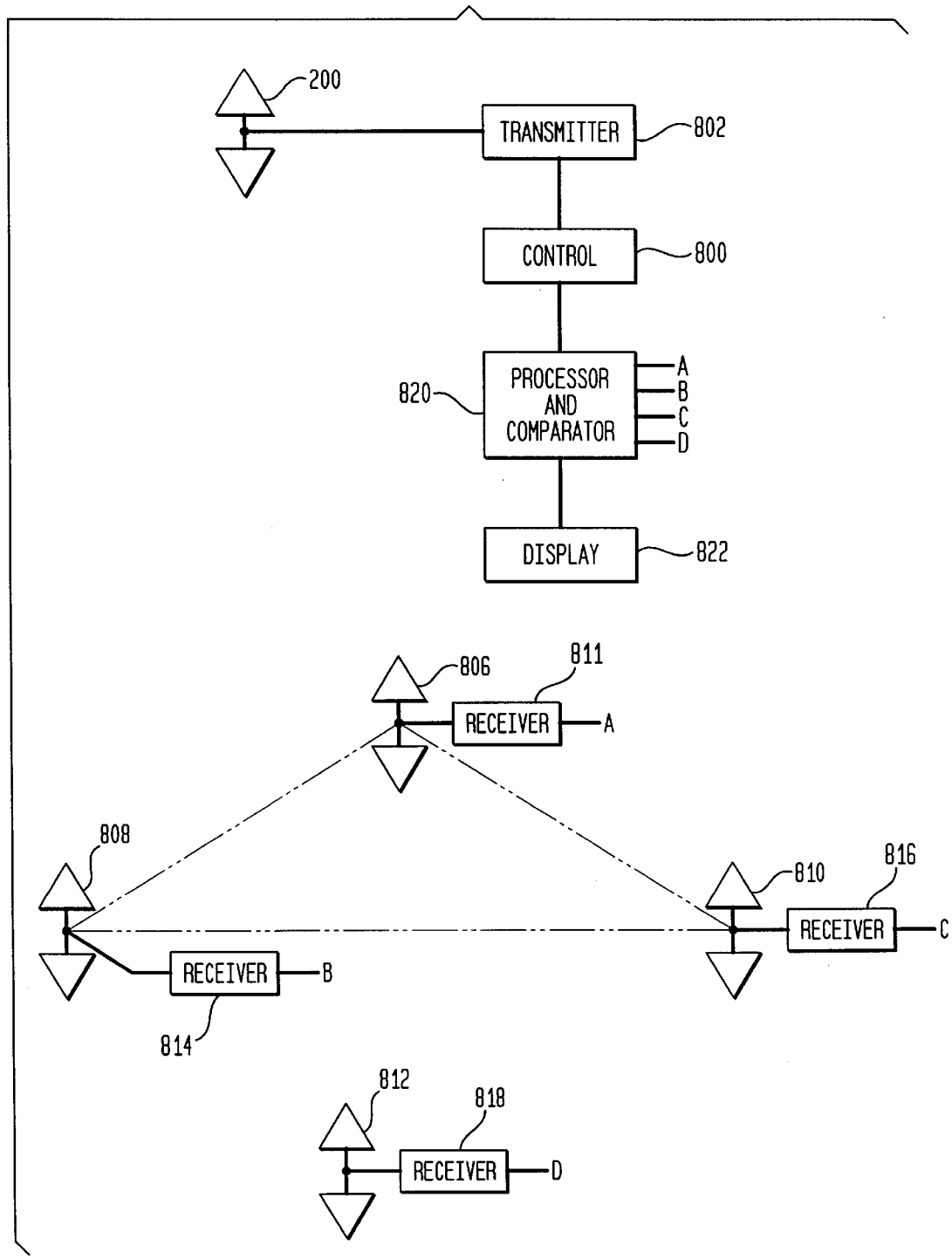

FIG. 19 illustrates an application of applicant's invention to a radar system wherein there is one transmitting antenna, e.g., antenna 200, located in a discrete plane position with respect to the direction of observation, three receiving antennas spaced in a plane parallel to the first plane, and a fourth receiving antenna positioned in a third plane. Thus, radiation from transmitting antenna 200, responsive to transmitter or transmitter switch 802, which is reflected by a target, is received by the four receiving antennas at varying times by virtue of the difference in path length. Because of the unique characteristic of applicant's system in that it can be employed to resolve literally inches, extreme detail can be resolved from the returns. Control 800 directs a transmission by a transmitter 802, which supplies a signal burst to transmitting antenna 200. Signal returns are received by antennas 806, 808, and 810 and are located, for example, in a plane generally normal to the direction of view and separate from the plane in which transmit antenna 200 is located. A fourth receiving antenna 812 is located in still a third plane which is normal to the direction of view and thus in a plane separate from the plane in which the other receiving antennas are located. By virtue of this, there is provided means for locating, via triangularization, a target in space, and thus there is derived sufficient signal information to enable three-dimensional information displays. The received signals from receivers 811, 814, 816, and 818 are separately supplied to signal processor and comparator 820, which includes a memory for storing all samples received and in terms of their time of receipt. From this data, one can compute position information by an appropriate comparison as well as target characteristics, such as size and reflectivity, and can be displayed on display 822.

Figure 20:
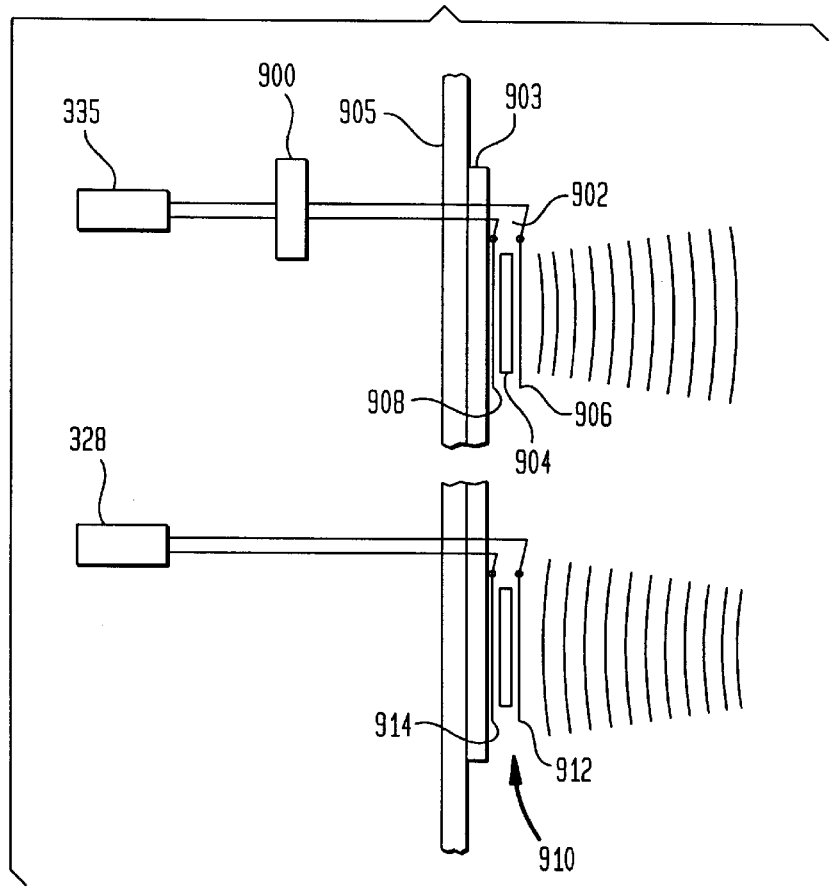
FIG. 20 is a schematic illustration of a modified portion of FIG. 1 illustrating transmission and reception of time domain type sonic signals.

FIG. 20 illustrates a portion of a radar system generally shown in FIG. 5 except that the pulse output of switch 335 is applied through an impedance matching device, i.e., resistor 900, to wideband sonic transducer 902. Sonic transducer 902 is a known structure, it being, for example, constructed of a thin piezoelectric film 904 on opposite sides of which are coated metallic films 906 and 908 as electrodes. The energizing pulse is applied across these plates. Impedance matching is typically required as switch 335 would typically supply a voltage from a relatively low impedance source whereas sonic transducer 902 typically would have a significantly higher impedance. The sonic output of sonic transducer 902, a wide frequency band, on the order of at least three octaves, would typically be attached to an impedance transformer for the type of medium into which the sonic signal is to be radiated; for example, transducer 902 would attach to a low impedance material 903, such as glass, in turn mounted on a support 905 (for example, the hull of a ship).

An echo or reflection from a target of the signal transmitted by sonic transducer 902 would be received by a similarly configured sonic transducer 910, and its output would then be coupled via plates 912 and 914 to amplifier 328 and thence onto mixer 330 as illustrated in FIG. 5 wherein operation would be as previously described.

Figure 21:
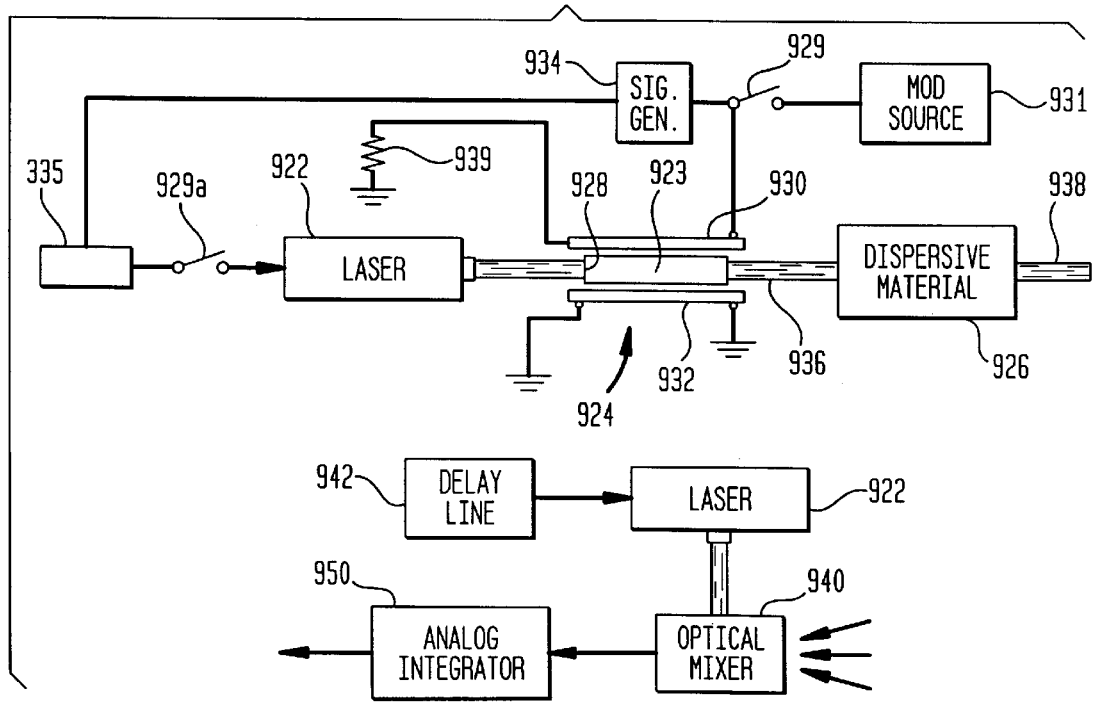
FIG. 21 is a schematic illustration of an alternate portion of FIG. 1 illustrating both the employment of like time domain signals and a like modulation system adapted to produce broadband modulated light signals from the output of a conventional narrow band laser.

FIG. 21 illustrates a broadband light transmitter. With respect to a first version, with switches 929 and 929a in the indicated positions, a pulse as from switch 335 (FIG. 5) triggers a conventional laser 922 operating, for example, in a conventional narrow frequency mode at approximately 700 nanometers to provide such an output to a narrow band to wideband light converter assembly consisting of light modulator 924 and a dispersive medium 926. The output of laser 922 is applied to one end 928 of a fiber optic 923 having a variable refractive index as a function of an applied voltage and, in this case, for example, having a thickness dimension on the order of 2 millimeters and a length dimension of approximately 1 meter. The fiber optic is positioned between two elongated metallic or otherwise conductive plates 930 and 932. A modulating voltage from signal generator 934, for example, a ramp voltage, is applied across the plates adjacent to the exiting end of fiber optic 923 and terminated by resistor 939 as a load and ground. Plate 932 is grounded at both ends to prevent destructive reflections. Generator 934 typically would be triggered also by switch 335 to create, in this example, a ramp voltage which would effect a traveling wave from right to left along the plates and thus along the enclosed fiber optic, opposing the traveling light pulse from left to right. As a result, there is effected a light output at end 936 which varies, changing from the initial wavelength of the input light:

pulse to a higher or lower frequency, and this, in effect, creates a chirp-type pulse. It is then supplied to a dispersive material 926 such as lead glass, with the result that at its output, the resultant light pulse is converted to a quite short duration pulse having a wide broadband spectrum of frequencies, or white or near white light output. Emitted beam 938 then travels outward, and upon striking a target, a reflection is reflected back to optical mixer 940 which is also supplied a laser output pulse from laser 942 (e.g., by a beam splitter), in turn triggered by a selectably variable delay line 942, being delayed in terms of selected range. As a result, optical mixer 940 multiplies the two input signals, a template signal and a received signal, and provides a multiplied output to integrator 950, and the signals are then processed as generally described with respect to FIG. 5.

It is believed of perhaps greater significance that light modulator 924, a light frequency modulator, has many other applications, particularly as an intelligence modulator of a laser beam.

Figure 22:
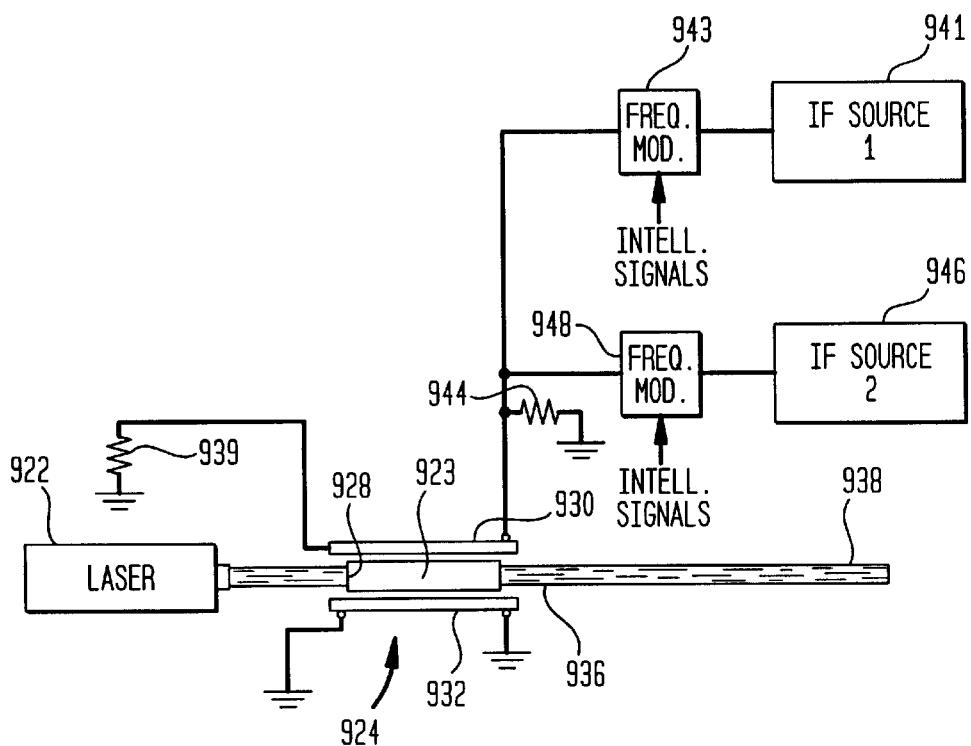
FIG. 22 is an illustration of an optical frequency modulator.

FIG. 22 illustrates a modification of the transmitter shown in FIG. 20, illustrating the technique of frequency modulation multiplexing of a plurality of intelligence signals. In this case, the same optical assembly 924 is illustrated as in FIG. 20, leaving out signal generator 934 and switch 335. Further, the dispersive material 926 would not be needed. Thus, there is provided to plate 930 a plurality of frequency modulated multiplexed signals in place of a radar type signal. Two frequency modulation signals are illustrated, and with respect to one of them, it would take this form. An IF source 941 would generate a first intermediate frequency signal, typically being small with respect to the frequency of the laser beam itself. Its output would be fed to frequency modulator 942 which would then frequency modulate the applied IF frequency over a desired frequency deviation, typically depending upon the bandwidth of the intelligence signal applied to it, and it would be supplied as a first intelligence signal as shown. Thus, the output of frequency modulator 942 would be provided as one input to plate 930 of the light modulator 924, being applied across summing resistor 944. As an illustration of multiplexing, a second IF frequency would be generated by IF source 946 at a different frequency than that generated by IF source 941, and it would be applied to frequency modulator 948, which in turn would receive a second intelligence signal. As a result, frequency modulator 948 would provide a selected frequency deviation of the IF frequency applied to it, and its output would also be provided to light modulator 924 across summing resistor 944. The combined outputs of modulators 942 and 948 would then be transmitted by optical modulator 924.

Figure 23:
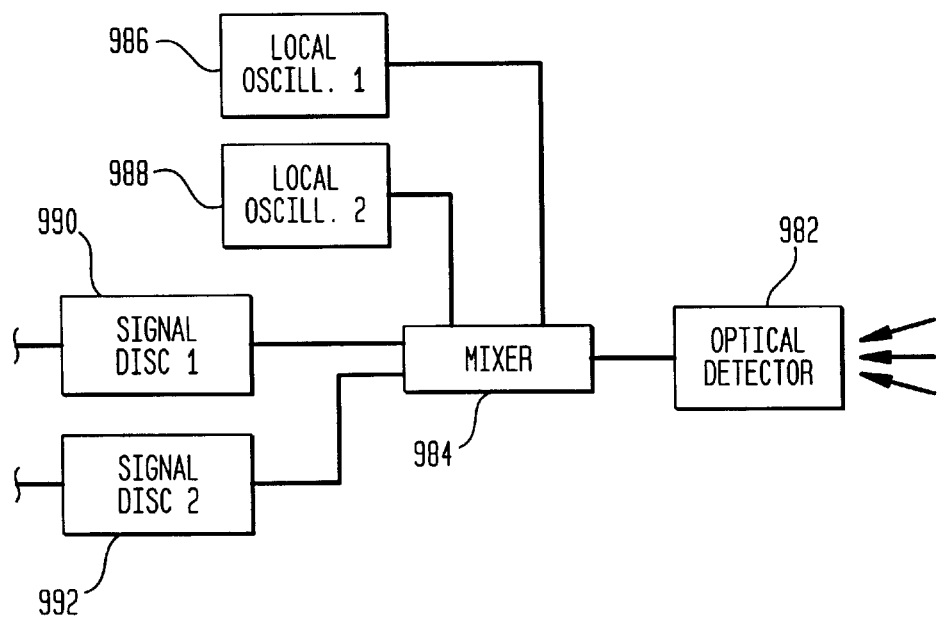
FIG. 23 is an illustration of an optical frequency demodulator.

Referring now to FIG. 23, which shows a receiver for the transmitter shown in FIG. 22, the signal output 938 of optical modulator 924 would be received in the receiver by optical detector 982 which would provide an electrical output to mixer 984 to which is also applied the two IF frequencies generated in FIG. 22, one by a local oscillator 986 and the other by oscillator 988. As a result, mixer 984 provides an output, being the first IF frequency modulation and a second frequency modulation, these being applied separately to signal discriminators 990 and 992 to thus provide typical analog outputs of the two modulations effected by the system shown in FIG. 22. Of course, where digital signals are involved, accordingly, the output of signal discriminators 990 and 992 would provide discrete outputs representative of the modulated levels for digital signals, either being of the multi-level type or binary type.

Of course, in a typical installation, there could be many, many separate signal discriminators, each providing a frequency modulated output of one set of intelligence. Thus in the system just described, there is provided a frequency modulated multiplex system which not only can carry many, many different signals, but also is quite cheap to construct, certainly much cheaper than the present system of high-speed digital communications.

Having thus described my invention, I claim:

1. A wideband transmission system comprising:

generating means for generating a plurality of time spaced signals, said signals varying in time spacing at least as a function of a selected signal source, and each signal of said plurality of signals having a stepped-in-amplitude portion;

transmitting means including a broad frequency band radiator responsive to said generating means for transmitting wideband, time-spaced, burst signals into a selected medium; and receiving means responsive to wideband burst signals present in said medium, as received signals, for processing said received signals comprising:
   a template circuit providing template pulse signals occurring in like time spacing to that of said signal source,
   a coincidence, coherent, detector responsive to said received signals and said template signals for providing as an output a signal pulse when a received signal and template signal are simultaneously present,
   integration means responsive to outputs from said coincidence detector for providing an integral output, and
   intelligence output means responsive to said integration means for providing an intelligence output when said integration means has an integrated output resulting from having integrated a plurality of signal outputs from said coincidence detector.

2. A system as set forth in claim 1 wherein a said template signal is of a curved amplitude character wherein the output of said coincidence detector has a varying gain across a cycle of detection, and said coincidence detector thereby provides gain for an enhanced signal output.

3. A system as set forth in claim 1 wherein said coincidence detector is a multiplier.

4. A system as set forth in claim 1 wherein:

said integration means comprises a short-term integrator for integrating, separately, a plurality of coincidently detected signals; and said intelligence output means includes a long-term integrator responsive to said short-term integrator for discretely sensing short-term integral signals and being insensitive to signal energy appearing between said short-term integrated signals.

5. A system as set forth in claim 1 wherein said system further includes modulation means coupled to said signals varying in time spacing as a function of a selected signal source, for additionally varying said last-named signals as a function of intelligence.

6. A system as set forth in claim 5 wherein said modulation means includes means for effecting a plurality of discrete values in time spacing which represent discrete coded levels of intelligence.

7. A system as set forth in claim 6 wherein said plurality comprises two time spacings, one representative of a "1" and the other representative of a "0."

8. A system as set forth in claim 1, wherein said template pulse signals each have a lobe with a first phase polarity and said received signals each have a lobe with a second phase polarity, and said coincidence detector provides an output when said received signal lobe and said template pulse signal lobe are coherent as to their phase polarity.

9. A system as set forth in claim 8 wherein said template pulses are of no longer duration than a said half cycle.

10. A system as set forth in claim 8, wherein said integration means comprises a first integrator means and a second integrator means, said first integrator means integrates said output of said coincidence detector for a integration time approximately equivalent to a period of one of said template pulse signals, and said second integrator means integrates an output of the first integrator means for an integration time greater that the period of one of said template pulse signals, whereby electrical energy reaching said first integrator means between occurrences of said template pulse signals is ignored, thus the presence of a signal output from said second integrator means indicates intelligence, whereby the signal-to-noise of said system is enhanced.

11. A wide spectrum transmission system comprising:

a pulse position modulator responsive to an intelligence signal and a dither signal, wherein said pulse position modulator produces a plurality of timing signals, wherein said timing signals vary in time as a function of said intelligence signal and said dither signal; and an output stage, including abroadband radiator, responsive to said timing signals, wherein said output stage outputs wide spectrum signals.

12. The wide spectrum transmission system of claim 11, further comprising a receiver configured to receive and detect said wide spectrum signals.

13. A wide spectrum transmission system comprising:

a pulse position modulator responsive to a dither signal, wherein said pulse position modulator produces a plurality of timing signals, wherein said timing signals vary in time as a function of said dither signal; and an output stage, including a broadband radiator, responsive to said timing signals, wherein said output stage outputs wide spectrum signals.

14. The wide spectrum transmission system of claim 13 further comprising a receiver configured to receive and detect said wide spectrum signals.

15. A method for the transmission of wide spectrum signals comprising the steps of:

(a) pulse position modulating responsive to an intelligence signal and a dither signal and outputting a plurality of timing signals, wherein said timing signals vary in time as a function of said intelligence signal and said dither signal;

(b) outputting wide spectrum signals responsive to said timing signals; and (c) radiating said wide spectrum signals.

16. The method of claim 15 further comprising a step of (d) receiving and detecting said wide spectrum signals.

17. A method for the transmission of wide spectrum signals comprising the steps of:

(a) pulse position modulating responsive to a dither signal and outputting a plurality of timing signals, wherein said timing signals vary in time as a function of said dither signal;

(b) outputting wide spectrum signals responsive to said timing signals; and (c) radiating said wide spectrum signals.

18. The method of claim 17 further comprising a step of (d) receiving and detecting said wide spectrum signals.

* * * * *

UNITED STATES PATENT AND TRADEMARK OFFICE
CERTIFICATE OF CORRECTION

Page 1 of 2

PATENT NO. : 5,952,956

DATED : September 14, 1999

INVENTOR : Larry W. Fullerton

It is certified that errors appear in the above-identified patent and that said Letters Patent is hereby corrected as shown below.

In Column 10, Line 51, please replace "regsiter" with --register--;

In Column 11, Line 33, please replace "201" with --200a--;

In Column 12, Line 41, please replace "$R_1$ and $R_2$" with --$R_{load}$--;

In Column 16, Line 61, please replace "514" with --515--;

In Column 16, Line 63, please delete "507 (FIG. 11)";

In Column 17, Line 58, please delete the first occurrence of "and";

In Column 20, Line 8, please delete the colon after "light";

In Column 20, Line 17, please replace "942" with --922--;

In Column 20, Line 41, please replace "942" with --943--;

In Column 20, Line 46, please replace "942" with --943--;

In Column 20, Line 56, please replace "942" with --943--;

In Column 22, Line 10, please replace "polaritv" with --polarity--;

In Column 22, at the beginning of Line 28, please replace "that" with --than--;

In Column 22, Line 42, please replace "abroadband" with --a broadband--;

UNITED STATES PATENT AND TRADEMARK OFFICE
CERTIFICATE OF CORRECTION

PATENT NO. : 5,952,956

DATED : September 14, 1999

INVENTOR : Larry W. Fullerton

It is certified that errors appear in the above-identified patent and that said Letters Patent is hereby corrected as shown below.

In Column 24, beginning at line 8, please insert the following claim:

--19. A system as set forth in claim 8 wherein said integration means comprises a first integrator, an amplifier, and a second integrator, connected in the named order, said first integrator integrating, separately, discrete outputs of said coincidence detector for the period of a said template pulse signal, said amplifier amplifying the output of said first integrator, and said second integrator being responsive to a plurality of amplified outputs of said amplifier for integrating said plurality of amplified outputs, whereby electrical energy reaching said first integrator between the times of said template pulse signals is ignored, thus the presence of a signal output from said second integrator indicates intelligence, whereby the signal-to-noise of said system is enhanced.--

Signed and Sealed this

Thirty-first Day of October, 2000

*Attest:*

Q. TODD DICKINSON

*Attesting Officer*     *Director of Patents and Trademarks*